(12) United States Patent
Sekiya et al.

(10) Patent No.: US 7,274,878 B2
(45) Date of Patent: Sep. 25, 2007

(54) DISPERSION COMPENSATION METHOD IN OPTICAL COMMUNICATION SYSTEM HAVING OPTICAL ADD DROP MULTIPLEXING CAPABILITY

(75) Inventors: Motoyoshi Sekiya, Kawasaki (JP); Kazuo Yamane, Kawasaki (JP); Ryosuke Goto, Kawasaki (JP); Satoru Okano, Hokkaido (JP); Takehito Okeno, Hokkaido (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 10/404,045

(22) Filed: Apr. 2, 2003

(65) Prior Publication Data

US 2003/0198473 A1 Oct. 23, 2003

(30) Foreign Application Priority Data

Apr. 19, 2002 (JP) .............................. 2002-117422

(51) Int. Cl.
*H04B 10/00* (2006.01)
*H04B 10/12* (2006.01)
*H04J 14/02* (2006.01)

(52) U.S. Cl. ........................ 398/118; 398/147; 398/83; 398/81

(58) Field of Classification Search .................. 398/83, 398/81, 147, 118
See application file for complete search history.

(56) References Cited

U.S. PATENT DOCUMENTS

| 5,877,881 | A | | 3/1999 | Miyauchi et al. |
| 5,943,151 | A | * | 8/1999 | Grasso et al. ............... 398/147 |
| 6,229,631 | B1 | | 5/2001 | Sato et al. |
| 6,229,935 | B1 | | 5/2001 | Jones et al. |
| 6,580,861 | B2 | * | 6/2003 | Bickham et al. ............. 385/123 |
| 6,621,621 | B1 | * | 9/2003 | Jones et al. ............. 359/337.11 |
| 2002/0036812 | A1 | * | 3/2002 | Bai .............................. 359/124 |
| 2003/0118347 | A1 | * | 6/2003 | Papaparaskeva et al. ... 398/147 |
| 2004/0208605 | A1 | * | 10/2004 | Bakhshi et al. ............. 398/147 |
| 2004/0208648 | A1 | * | 10/2004 | Fishman et al. ............. 398/189 |

FOREIGN PATENT DOCUMENTS

| CA | 2 385 356 | 3/2001 |
| JP | 9-153859 | 6/1997 |
| JP | 9-284218 | 10/1997 |
| JP | 11-8590 | 1/1999 |
| JP | 2000-502848 | 3/2000 |

* cited by examiner

*Primary Examiner*—Kenneth Vanderpuye
*Assistant Examiner*—Ken Malkowski
(74) *Attorney, Agent, or Firm*—Staas & Halsey LLP

(57) ABSTRACT

Dispersion compensation values are set so as to be transmittable to any path groups in a WDM optical communication system having OADM nodes, which includes transmitting-end and receiving-end terminal nodes; a WDM optical communication transmission line including a plurality of spans each having an optical fiber, the plurality of spans joining the transmitting-end and receiving-end terminal nodes; and a plurality of add drop multiplexing (OADM) nodes disposed on the optical communication transmission line; wherein when taking as the reference a residual dispersion target value of between the transmitting-end terminal and receiving-end terminal nodes, a residual dispersion target value for a node segment between one of the terminal nodes and one of the add drop multiplexing (OADM) nodes and a residual dispersion target value for a node-to-node segment between two of the add drop multiplexing (OADM) nodes are set so as to be proportional to ratios of the span counts in the node segment and in the node-to-node segment, respectively, to the total span count between the transmitting-end and receiving-end terminal nodes.

7 Claims, 22 Drawing Sheets

FLOW OF SIGNAL

DISPERSION COMPENSATION METHOD IN OPTICAL COMMUNICATION SYSTEM HAVING OPTICAL ADD DROP MULTIPLEXING CAPABILITY

BACKGROUND OF THE INVENTION

1. Field of the Invention

The present invention relates generally to a wavelength division multiplexing (WDM) optical communication system having optical add drop multiplexing (OADM) capability. More particularly, the invention relates to a wavelength division multiplexing optical communication system featured by its dispersion compensation method.

2. Description of the Related Arts

As a WDM optical communication system, a linear repeater transmission system using an optical amplifier is an effective means for lowering the cost of lines. Such a system has an OADM (Optical Add Drop Multiplexing) capability not only to carry out point to point transmission between terminals, but also to carry out insertion(ADD)/branching (DROP) of some of signals as unchanged light at an intermediary node.

Such an OADM capability is necessary to makeup of a low-cost and flexible optical network. Accordingly, in the WDM linear repeater transmission system, an electrical/optical (E/O) converter is placed at a transmitting-end terminal node, and an optical/electrical (O/E) converter is placed at a receiving-end terminal node. This allows transmission between the receiving-end and transmitting-end terminal nodes to be carried out.

Further, at an intermediary node, an optical signal insert (ADD)/branch (DROP) circuit is placed to add/drop a signal. A passing channel ("through" ch) is allowed to pass through in the form of an intact optical signal, whereas some channels may be inserted (ADD)/branched(DROP)as unchanged optical signals. Such a node is referred to as an OADM node.

A typical WDM optical communication system suffers a waveform distortion due to wave dispersion (time delay per unit duration corresponding to wavelength), which may occur in the optical transmission line. To suppress waveform distortion caused by this waveform dispersion, a dispersion compensator is placed at each Term ILA (Terminal In Line AMP) and OADM node.

Further, for the setting of the amount of compensation in the dispersion compensator, it is necessary to set a target value for the difference (hereinafter referred to as resilient dispersion) between the total amount of dispersion of the transmission line and the total amount of compensation of the dispersion compensator so as to fall within a tolerance range around an optimal value.

On the other hand, in the linear repeater transmission system having an optical amplifier repeater, chirp will occur in the transmission line, due to nonlinear effectiveness (SPM: Self Phase Modulation, where the refractive index of fiber depends on light intensity, or XPM: Cross Phase Modulation, where the refractive index changes as a function of signal intensity of other wavelengths) which may appear in the transmission line. Because of this the target value for residual dispersion will differ in response to the number of spans and span length.

FIGS. 1A and 1B illustrate the above, showing an exemplary configuration of a wavelength division multiplexing (WDM) optical communication system. With the example shown in FIG. 1A, a 3R (retiming, regenerating, reshaping) span between a terminal node #A and a terminal node #B is made up of 15 spans.

OADM nodes #1 and #2 are placed at 5-span intervals, and a signal is inserted (ADD) /branched (DROP) at the OADM nodes #1 and #2.

Accordingly, as shown in FIG. 1B, the formation of path groups ①-⑥ is possible. The path groups ④, ⑤, and ⑥ have the span count of 5, and the path groups ② and ③ have the span count of 10, and further the path group ① has the longest span count of 15.

In such a configuration, as can be understood from FIG. 2 which shows the range of a transmittable residual dispersion value for each span count, and assuming that the optical fiber is SMF (Single Mode Fiber) and that the distance of 1 span is 100 km, then the optimal resilient dispersion value determined from the transmission characteristics is about −300 [ps/nm], from line A which shows the optimal dispersion value, for the path groups ④, ⑤, and ⑥ which have the span count of 5; near zero for paths ② and ③ which have the span count of 10; and near about +200 [ps/nm] for the path group ① which has the span count of 15.

On the contrary, as a method of setting the residual dispersion value, one method hitherto supposed by inventors of the present invention is shown in FIGS. 3A and 3B. This method, in FIG. 3A, makes use of a transmitting-end dispersion compensator (DCT) 10 which compensates dispersion at the former portion every 1 span, and a line dispersion compensator (DCL) 11 which compensates dispersion at the latter portion every 1 span, to make a residual dispersion value R D which occurred at 1 span equal to zero. In this method, even at each OADM node #1 and #2 the residual dispersion value RD is made equal to zero.

FIGS. 4A and 4B are diagrams showing a different method supposed by the inventors of the present invention. With this method, in FIG. 4A, wavelength dispersion is compensated at the former portion by the transmitting-end dispersion compensator (DCT) 10 every 1 span, and wavelength dispersion is compensated at the latter portion by a line dispersion compensator (DCL) 11 every 1 span. Further, as shown in FIG. 4B at receiving-end dispersion compensators 12, 13, and 14 of the 5$^{th}$ span, the optimal residual dispersion value for the span count 5 path groups ④, ⑤, and ⑥ is set to be about −300 [ps/nm]. By doing so an optimal residual dispersion value for the path groups ④, ⑤, and ⑥ can be achieved.

However, in FIGS. 1A and 1B, for the signal of the path group ① which passes through 15 spans at the terminal node #B, the difference from the optimal residual dispersion value becomes large at about 1,100 [ps/nm]. Because of this, the signal of the path group ① cannot be carried to the terminal node #B.

Therefore, with the method shown in FIG. 3, when setting within the tolerance range a residual dispersion value required for the path group ① passing through 15 spans by the dispersion compensator 14 (RD=+200 [ps/nm]), an optimal residual value may become unachievable as shown in FIG. 3B for a signal of the path group ⑥ which is added at the OADM node #2 shown in FIG. 1B, and the transmission may possibly become difficult.

On the other hand, with the method in FIGS. 4A and 4B, for the path group ① passing through 15 spans, the residual dispersion value at the terminal node #B is −900 [ps/nm], and the optimal residual dispersion value cannot be set within the tolerance range shown in FIG. 2. Because of this, transmission is difficult for the signal of the path group ①.

SUMMARY OF THE INVENTION

It is therefore the object of the present invention to provide a method of setting an allowable residual dispersion value, which enables transmission for any path group, as well as to provide a wavelength division multiplexing (WDM) optical communication system using this method.

In order to achieve the above object, according to a first aspect of the present invention there is provided a wavelength division multiplexing optical communication system comprising a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line; wherein when taking as the reference a residual dispersion target value of between the transmitting-end terminal node and the receiving-end terminal node, a residual dispersion target value for a node segment between one of the terminal nodes and one of the add drop multiplexing (OADM) nodes and a residual dispersion target value for a node-to-node segment between two of the add drop multiplexing (OADM) nodes are set so as to be proportional to ratios of the span counts in the node segment and in the node-to-node segment, respectively, to the total span count between the transmitting-end and receiving-end terminal nodes.

When a channel added or dropped at an add drop multiplexing (OADM) node falls outside of a tolerance range having an allowable maximum dispersion value and an allowable minimum dispersion value for the residual dispersion target value, the added or dropped channel may be provided with an additional dispersion compensator.

When a channel added or dropped at an add drop multiplexing (OADM) node falls outside of a tolerance range having an allowable maximum dispersion value and an allowable minimum dispersion value for the residual dispersion target value, the added or dropped channel may be provided with a control unit which controls the setting of chirp of a transmitter.

Preferably, the add drop multiplexing (OADM) node has dispersion compensators disposed at its transmitting-end and receiving end, respectively, and the amount of compensation of the transmitting-end dispersion compensator is determined from an average span distance of spans following an associated add drop multiplexing (OADM) node or from an average transmission line dispersion value.

Preferably, the add drop multiplexing (OADM) node has dispersion compensators disposed at its transmitting-end and receiving end, respectively, and the amount of compensation of the transmitting-end dispersion compensator is determined from a span distance of a span immediately posterior to an associated add drop multiplexing (OADM) node or from a transmission line dispersion value.

Preferably, the add drop multiplexing (OADM) node has dispersion compensators disposed at its transmitting-end and receiving end, respectively, and the amount of dispersion compensation of the dispersion compensator at the receiving end of the add drop multiplexing (OADM) node is determined so as to coincide with a residual dispersion target value for the span count from the transmitting-end terminal node to the add drop multiplexing (OADM) node.

In order to attain the above object, according to a second aspect of the present invention there is provided a method of setting the amount of dispersion compensation in a wavelength division multiplexing optical communication system, the system comprising a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line; the method comprising the steps of taking as the reference a residual dispersion target value of between the transmitting-end terminal node and the receiving-end terminal node; figuring out ratios of the span counts in a node segment between one of the terminal nodes and one of the add drop multiplexing (OADM) nodes and in a node-to-node segment between two of the add drop multiplexing (OADM) nodes, to the total span count between the transmitting-end and receiving-end terminal nodes; and setting residual dispersion target values for the node segment between one of the terminal nodes and one of the add drop multiplexing (OADM) nodes and a residual dispersion target value for the node-to-node segment between two of the add drop multiplexing (OADM) nodes, so as to be proportional to the ratios, using the residual dispersion target value obtained as the reference in the taking step.

The method may further comprise the step of setting additional dispersion compensation values when a channel added or dropped at the add drop multiplexing (OADM) node falls outside of a tolerance range having an allowable maximum dispersion value and an allowable minimum dispersion value for the residual dispersion target value.

The method may further comprise the step of controlling the setting of chirp of a transmitter, for a channel added or dropped at the add drop multiplexing (OADM) node, when the added or dropped channel falls outside of a tolerance range having an allowable maximum dispersion value and an allowable minimum dispersion value for the residual dispersion target value.

The method may further comprise the step of, at the transmitting end of the add drop multiplexing (OADM) node, setting the amount of compensation which is determined from an average span distance of spans following an associated add drop multiplexing (OADM) node or from an average transmission line dispersion.

The method may further comprise the step of, at the transmitting end of the add drop multiplexing (OADM) node, setting the amount of compensation which is determined from a span distance of a span immediately posterior to an associated add drop multiplexing (OADM) node or from a transmission line dispersion.

Preferably, the amount of dispersion compensation of a dispersion compensator at the receiving end of the add drop multiplexing (OADM) node is determined so as to coincide with a residual dispersion target value for the span count from the transmitting-end terminal node to the add drop multiplexing (OADM) node.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Embodiments of the present invention will now be described with reference to the drawings. It is to be noted however that application of the present invention is not limited to the examples illustrated in the diagrams.

Figure 5A:
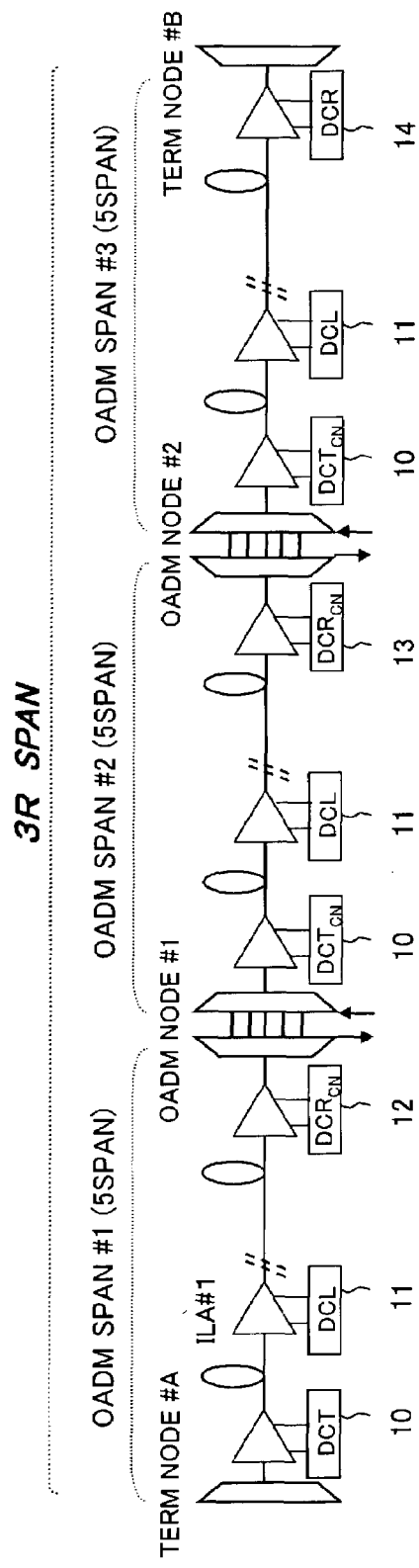
FIGS. 5A and 5B show a first embodiment of an optical communication system having an optical add drop multiplexing capability, to which the present invention is applied.
Figure 5B:
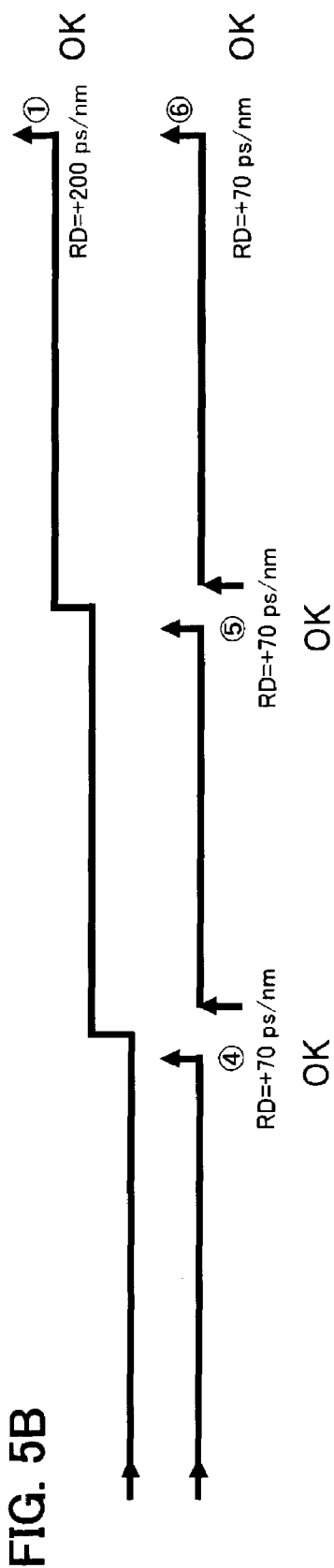
Figure 6:
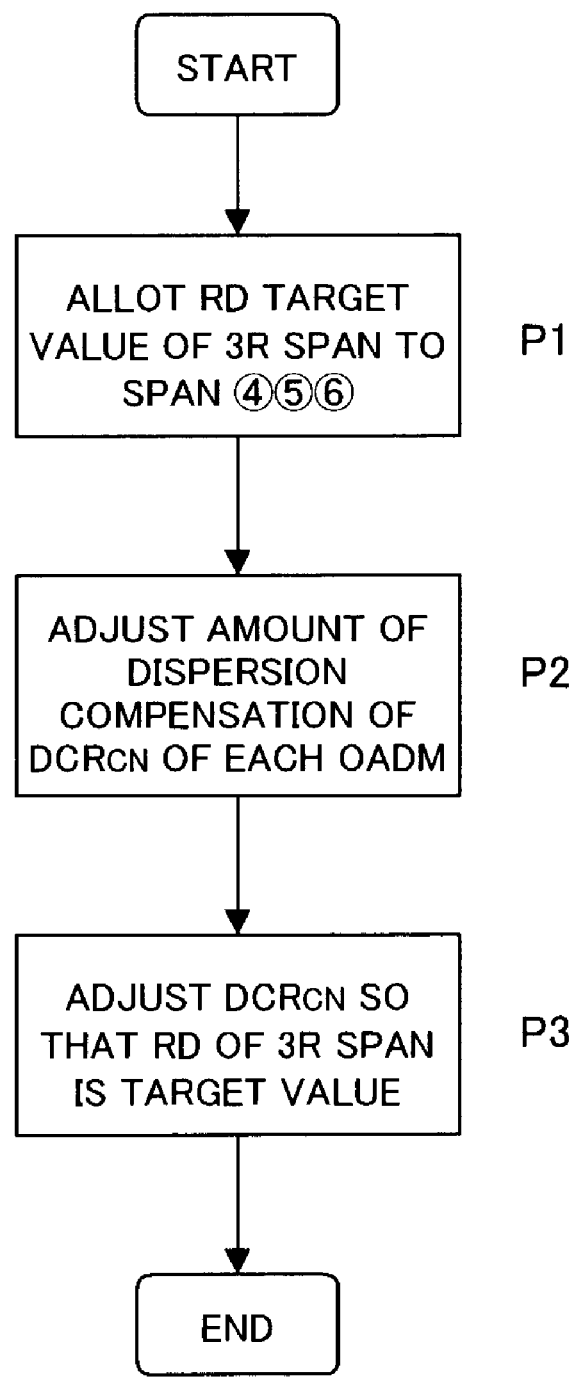
FIG. 6 shows a process flow of the first embodiment of the present invention.

FIGS. 5A and 5B show a first embodiment of an optical communication system having an optical add drop multiplexing capability, to which the present invention is applied. FIG. 6 shows a process flow of the embodiment of FIGS. 5A and 5B. The configuration of the transmission system of FIG. 5A is similar to that shown in FIG. 1A.

The fundamental concept behind the present invention is to equally distribute the residual dispersion (RD)target value of a 3R span between a terminal node #A and a terminal node #B to path groups ④, ⑤, and ⑥ which correspond to a span between the terminal node #A and an OADM node #1, a span between the OADM node #1 and an OADM node #2, and a span between the OADM node #2 and a terminal node #B, respectively.

Thus, as shown in FIG. 5B, a residual dispersion (RD) target value of the 3R span between the terminal node #A and the terminal node #B is set to a target value corresponding to path group ①.

This target value is equally distributed to path groups ④, ⑤, and ⑥ corresponding to every 5 spans of between the terminal node #A and the OADM node #1, between the OADM node #1 and the OADM node #2, and between the OADM node #2 and the terminal node #B.

Figure 2:
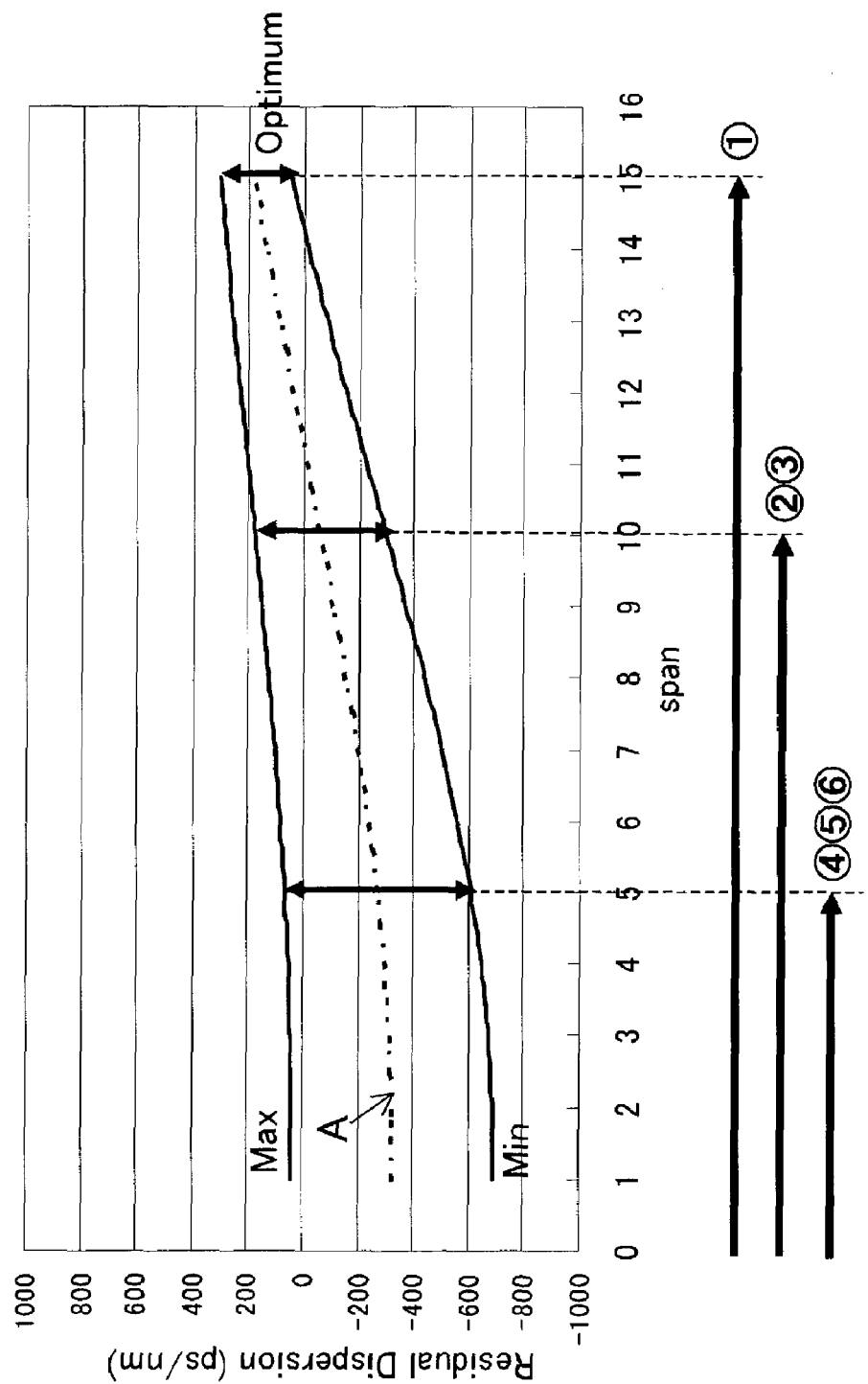
FIG. 2 is an illustration of an optimal residual dispersion value for each path group, showing the range of a transmittable residual dispersion value of each span count in the configuration of FIGS. 1A and 1B.
Figure 7:
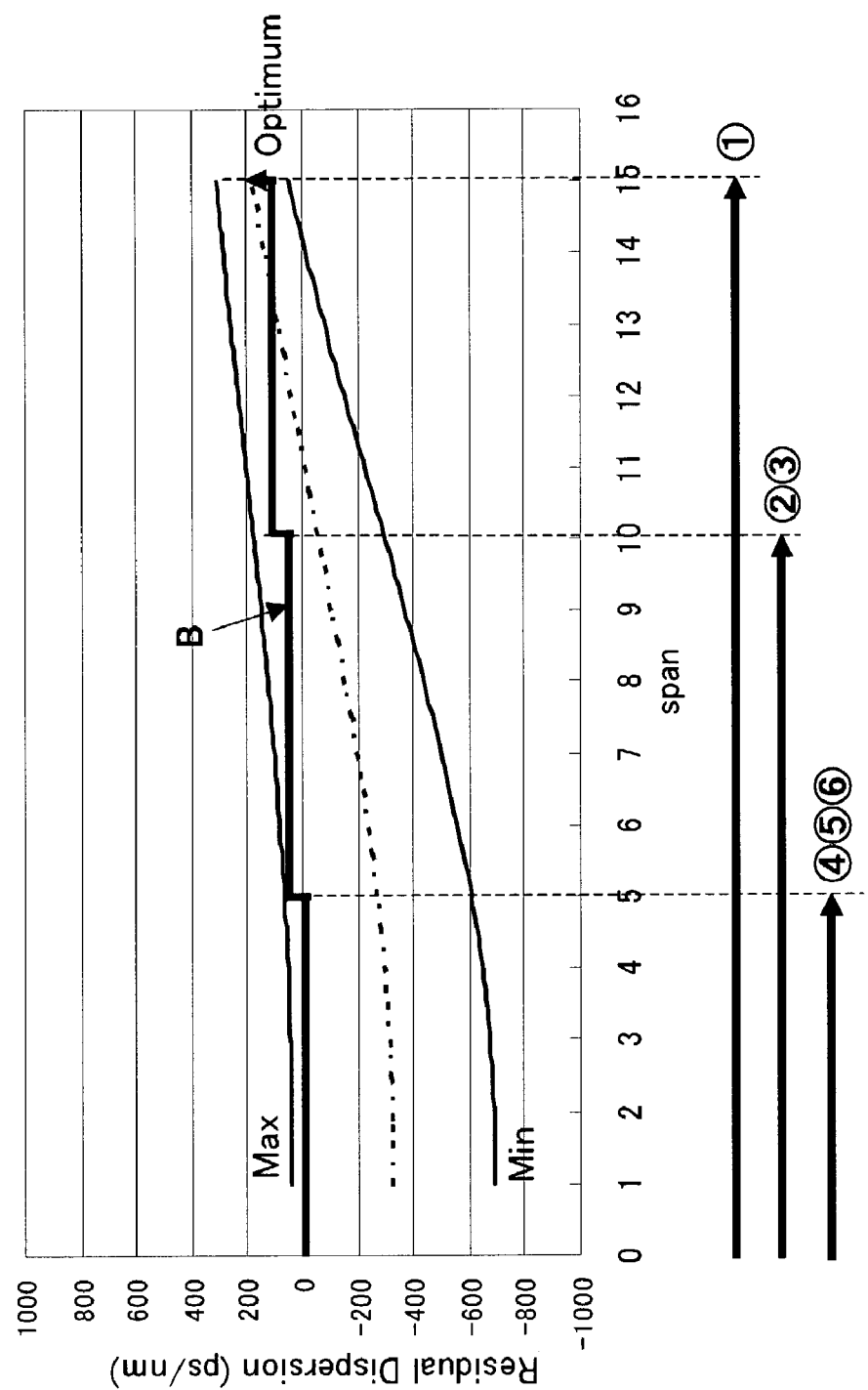
FIG. 7 shows an allowable range for a transmittable residual dispersion value at each span count corresponding to FIG. 2.

By this distribution, following a characteristic curve B of FIG. 7 which shows an allowable range of transmittable residual dispersion of each span count corresponding to FIG. 2, it can be set so that the residual dispersion increases equally accordingly as the span count becomes larger.

Because of this, by the flow shown in FIG. 6, first, a target value of a 3R span is equally allotted to 5 spans of path groups ④, ⑤, and ⑥ by the formula below (process step P1).

RD target value of OADM span=target value of 3R span/total span count x span count of associated OADM spans With the example shown in FIG. 5B, the OADM spans #1, #2, and #3 are the same, and the target value of a 3R span is +200 [ps/nm], so the RD target value of the OADM spans is +200 ÷3≈+70 [ps/nm].

Next, the amount of dispersion compensation of the receiving-end dispersion compensators(DCR$_{CN}$) 12, 13 of each of the OADM spans #1 and #2 is adjusted to become +70 [ps/nm], so as to be the RD target value of the OADM spans figured out in the process step P1 (process step P2).

As for the final OADM span #3, the amount of dispersion compensation of the receiving-end compensator(DCR$_{CN}$) 14 is adjusted so that the residual dispersion of the 3R span is the target value (+200 [ps/nm] with the example in FIG. 1B)(process step P3).

Figure 3A:
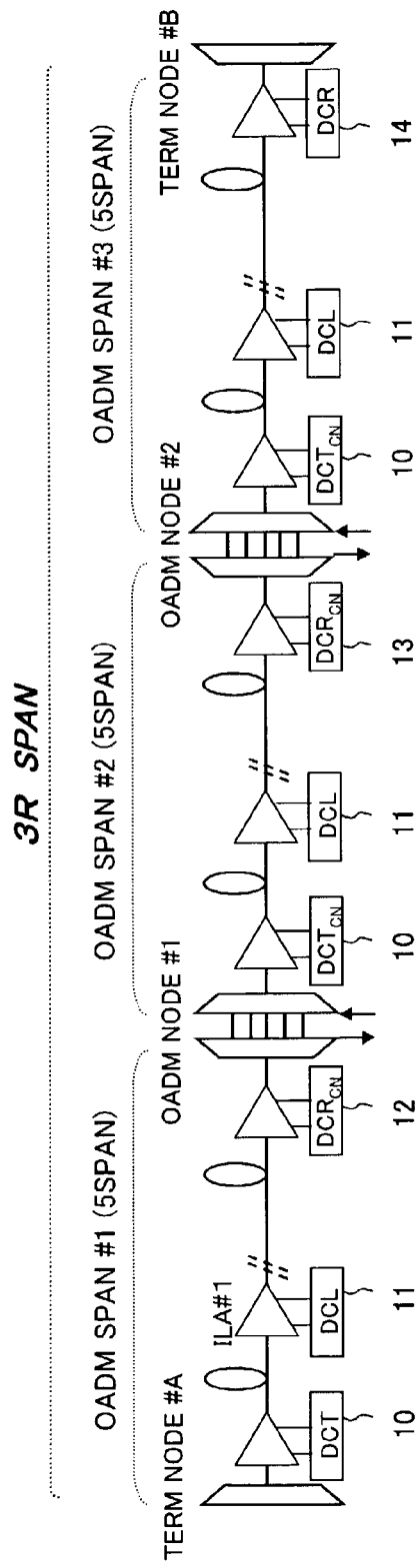
FIGS. 3A and 3B show a method supposed by the inventors of the present invention, as a method of setting a residual dispersion value.
Figure 3B:
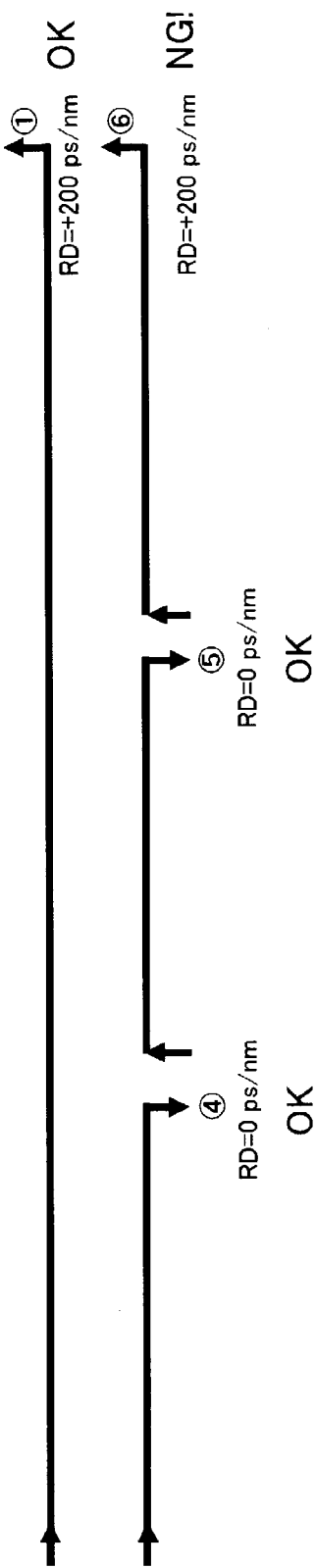
Figure 4A:
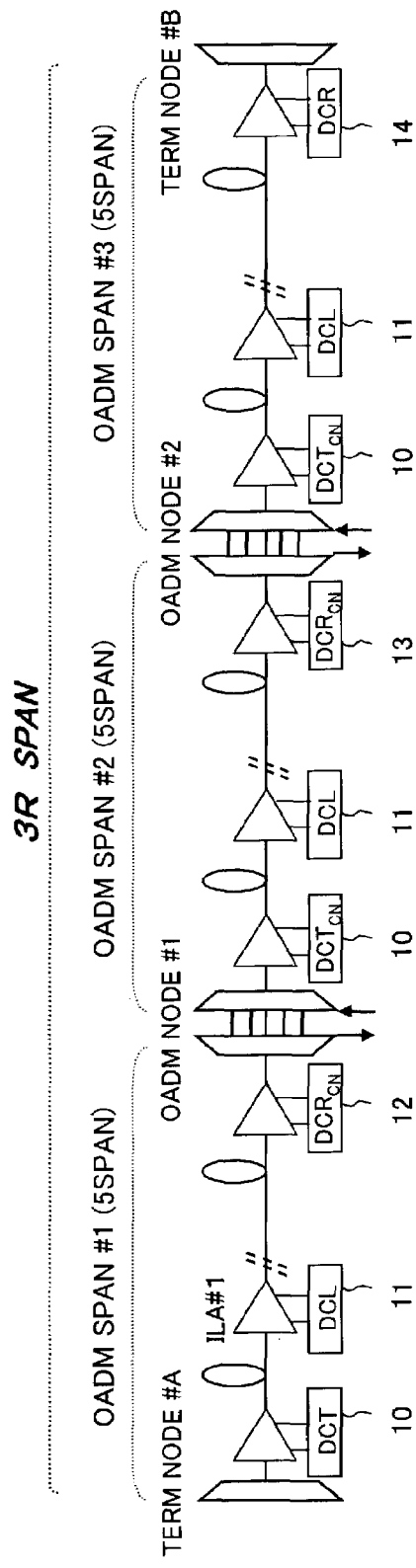
FIGS. 4A and 4B show another method supposed by the inventors of the present invention, as a method of setting a residual dispersion value.
Figure 4B:
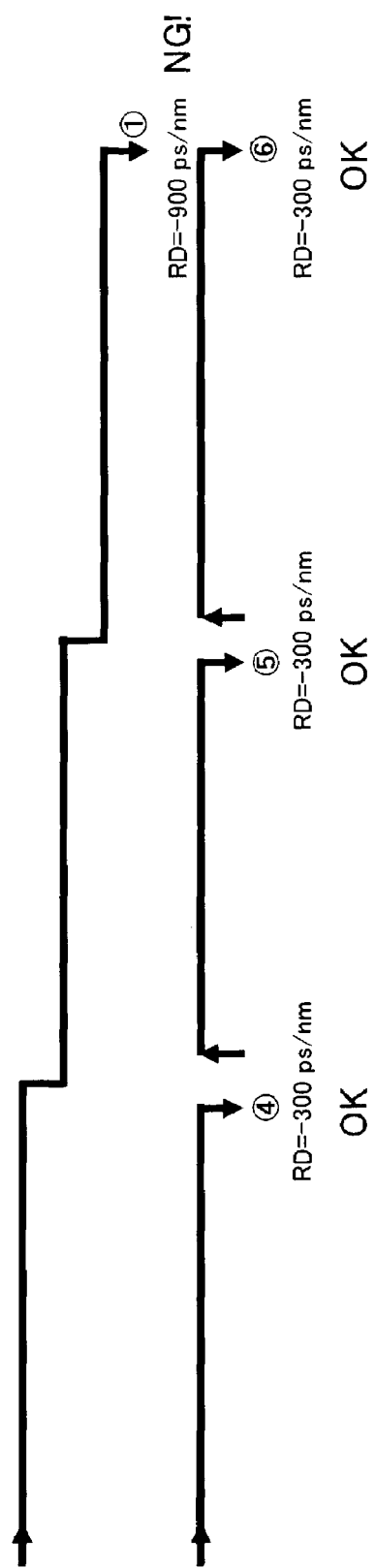

In this way, an optimal desired residual dispersion value for a path group (the path group ① in the example in FIG. 1A) of the longest span is equally allotted to each of the OADM spans #1, #2, and #3. This allows transmission to be made for the signal of path group ⑥ which is added from the OADM node #2, which is the problem illustrated in FIG. 3B.

Further, as another embodiment, it is also possible to set the amount of compensation of the transmitting-end dispersion compensator 10 at the OADM nodes #1 and #2, as well as of the receiving-end dispersion compensators 12 and 13, in the following manner.

It would thus be possible to determine the amount of compensation for the dispersion compensator 10 of the transmitting end from the span distance of the latter part of the associated OADM nodes #1 and #2, and to set the amount of dispersion compensation for the dispersion compensator 12 of the receiving end at the OADM node #1 so as to become a residual dispersion target value of span count from the transmitting-end terminal node #A to the OADM node #1.

As a characteristic of the WDM optical communication system, when using the dispersion compensation fiber for the dispersion compensator, variability of the residual dispersion value due to a slope compensation factor is known.

Figure 8:
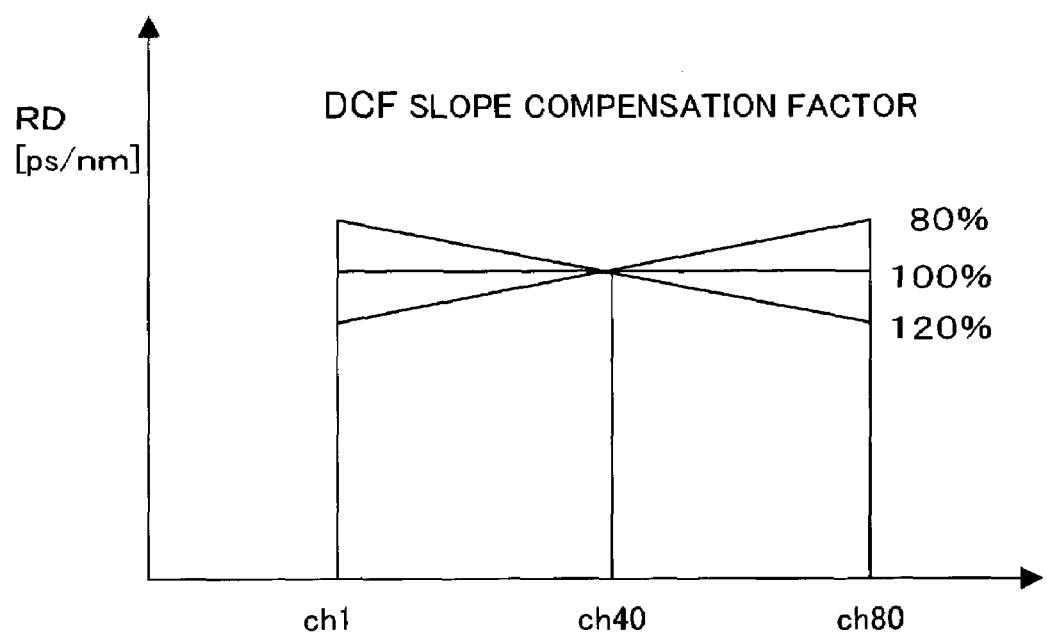
FIG. 8 shows a slope compensation factor determined by specification characteristics of a dispersion compensator (DCF) using a dispersion compensation fiber.

FIG. 8 shows a slope compensation factor determined by specification characteristics of the dispersion compensator using the dispersion compensation fiber (DCF), and when the slope compensation factor is 100%, it would be possible to make the residual dispersion value uniform for the full band channels.

However, if the slope compensation factor exceeds 100%, there is a tendency for the residual dispersion of short wavelength-end channels to be bigger than for central wavelength channels (40 ch, supposing total channel number to be 80 ch). Oppositely, if the slope compensation factor is equal to or less than 100%, there is a tendency for the residual dispersion of long wavelength channels to be bigger than for central wavelength channels.

Figure 9:
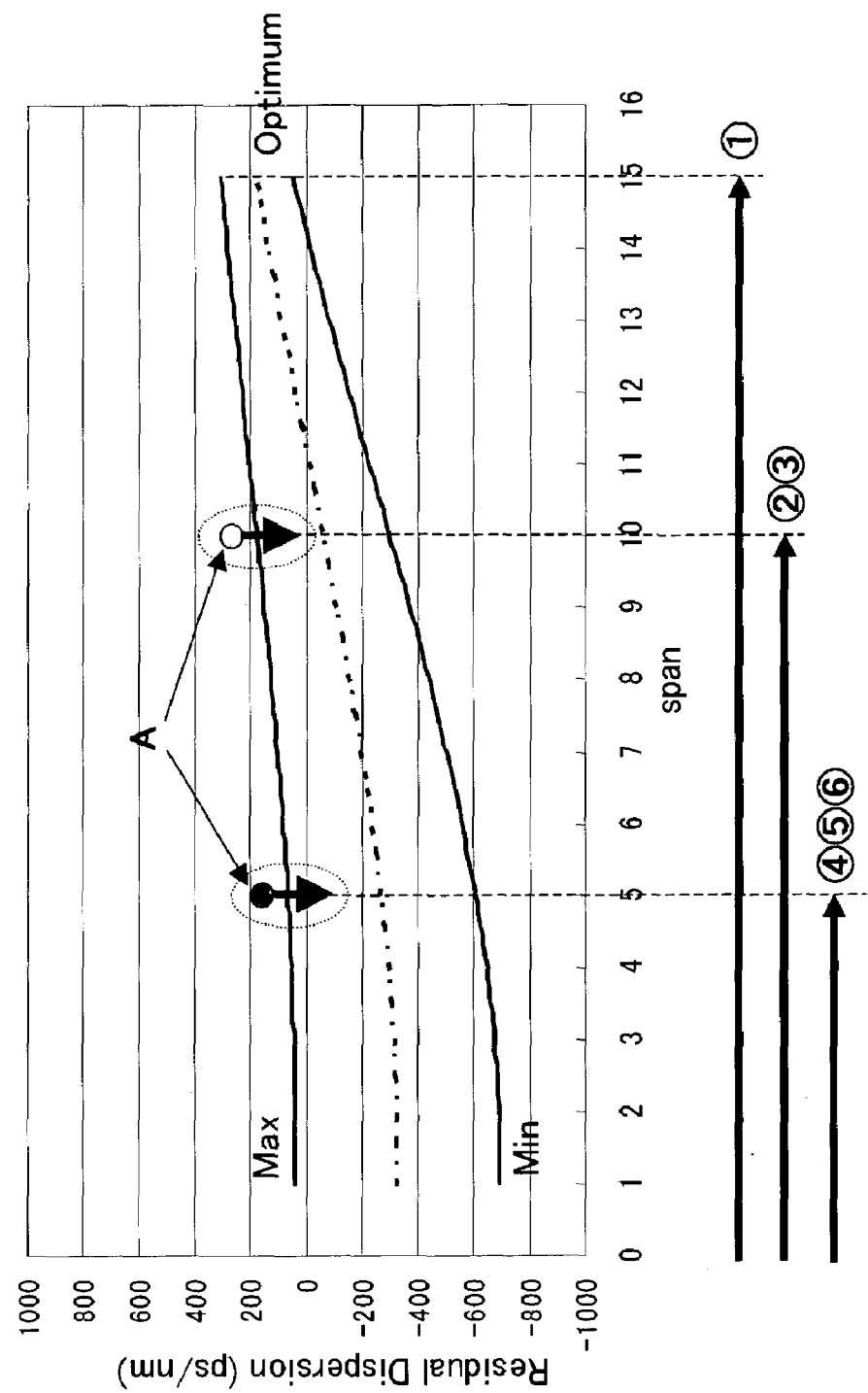
FIG. 9 shows a variance in the maximum (Max) and minimum (Min) of the residual dispersion value for each span count from a terminal node #A determined by transmission characteristics.

For this reason, due to the slope compensation factor, individual channels may possibly exist that exceed the maximum and minimum residual dispersion values. FIG. 9 shows variances of maximum (Max) and minimum (Min) residual dispersion values of for each span count from the terminal node A determined by transmission characteristics. Accordingly, with the embodiment process flow in FIG. 6 it is necessary to set the amount of compensation of the dispersion compensators 12 and 13 so as to fall within the range between the maximum (Max) and minimum (Min) allowable values at the OADM nodes #1 and #2.

In FIG. 9, however, due to the slope compensation factor of the dispersion compensation fiber (DCF) shown in FIG. 8, the residual dispersion value may possibly exceed the maximum value (Max) in the individual channels ch. In FIG. 9, at the OADM node #1 and #2 of the 5$^{th}$ span and 10$^{th}$ span, the actual residual dispersion value A exceeds the allowable maximum value for specific channels ch.

Accordingly, as an embodiment of the present invention, a dispersion compensator is individually added for the specific channels ch and compensates to let it fall within the tolerance range in such instances.

Figure 10A:
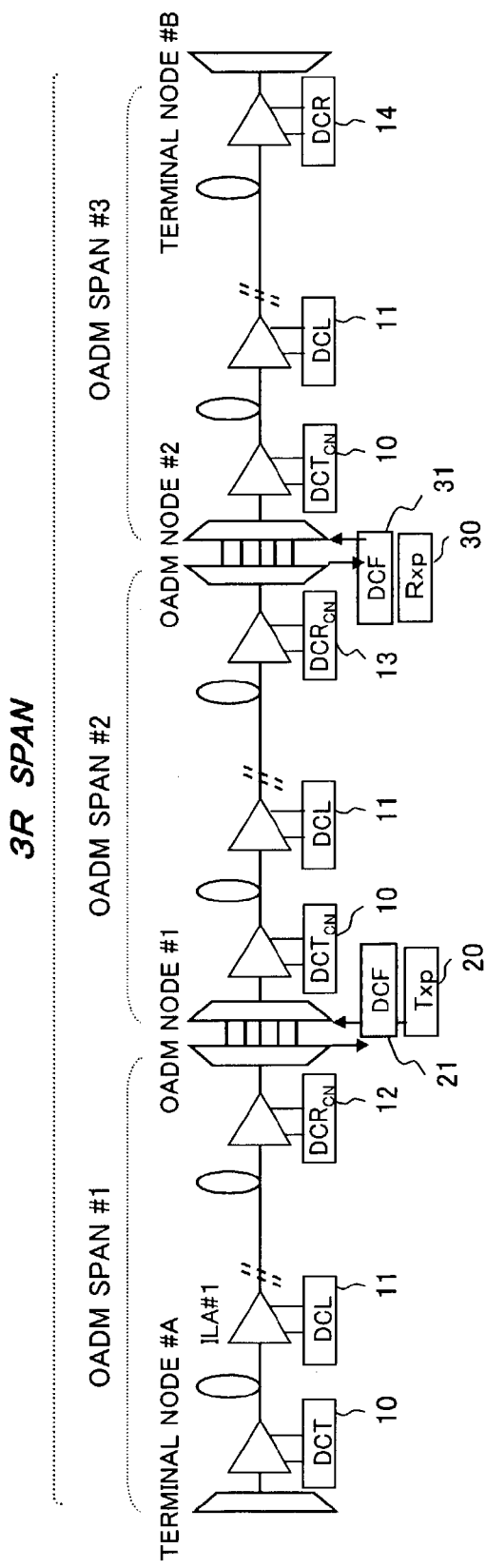
FIGS. 10A and 10B show a configuration of the WDM optical communication system for coping with instances where a residual dispersion value exceeds a dispersion tolerance at an individual channel ch, and a flow of signal.
Figure 10B:
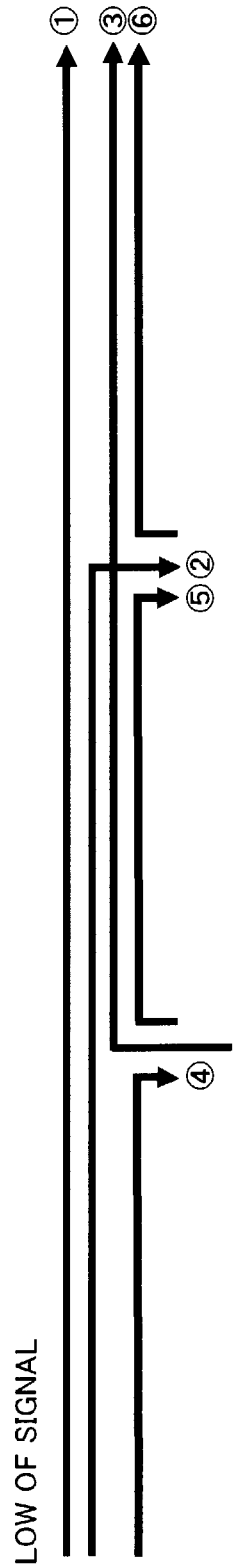

FIGS. 10A and 10B show a configuration (FIG. 9A) and a signal flow (FIG. 9B) of the WDM optical communication system to deal with instances of the residual dispersion value exceeding the dispersion tolerance in the individual channels ch illustrated in FIGS. 8 and 9. Also, FIG. 11 shows a process flow of FIGS. 10A and 10B.

Figure 1A:
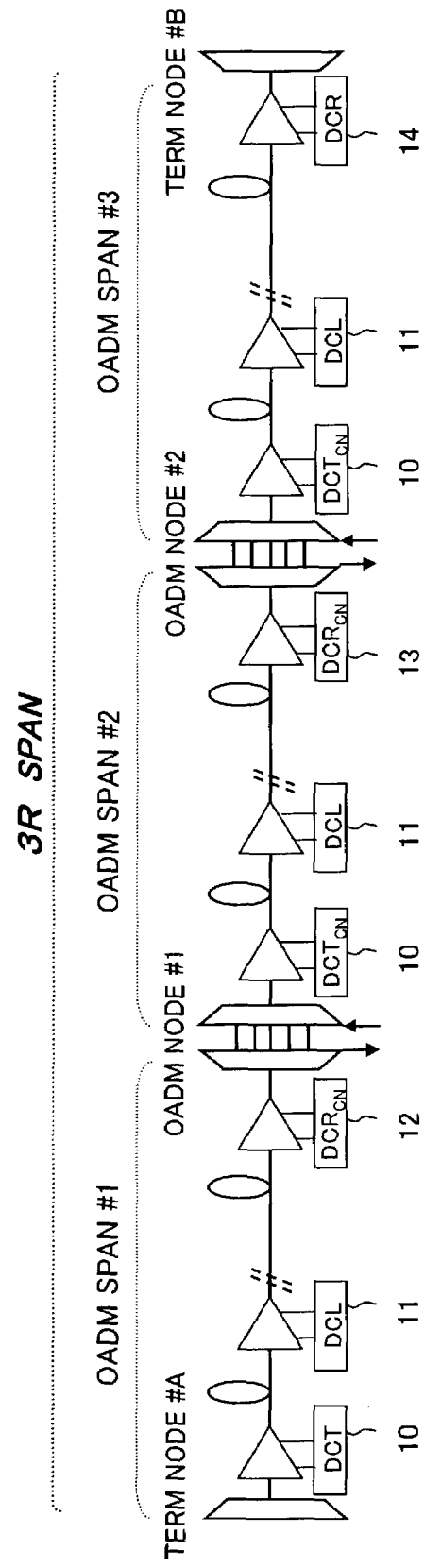
FIGS. 1A and 1B show an exemplary configuration of a wavelength division multiplexing (WDM) optical communication system.
Figure 1B:
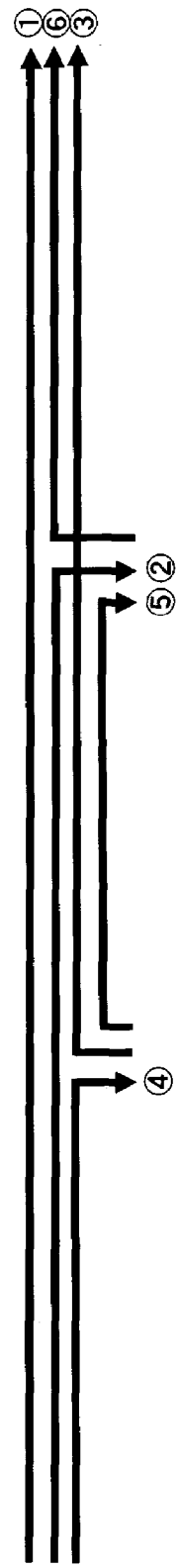

In FIG. 10A, a 3R span is made up of 15 spans similar to FIG. 1A. As a feature, a dispersion compensation fiber 21 is provided as an additional dispersion compensator at the output end of a transmitter 20 which is connected to the add-end of the OADM node #1, and a dispersion compensation fiber 31 is provided as an additional dispersion compensator at the input end of a receiver 30 which is connected to the drop-end of an OADM node #2.

Then, for the individual channel ch where the residual dispersion value exceeds the tolerance range, the compensation fibers 21 and 31 make adjustment so that the residual dispersion value falls within the dispersion tolerance range.

Figure 11:
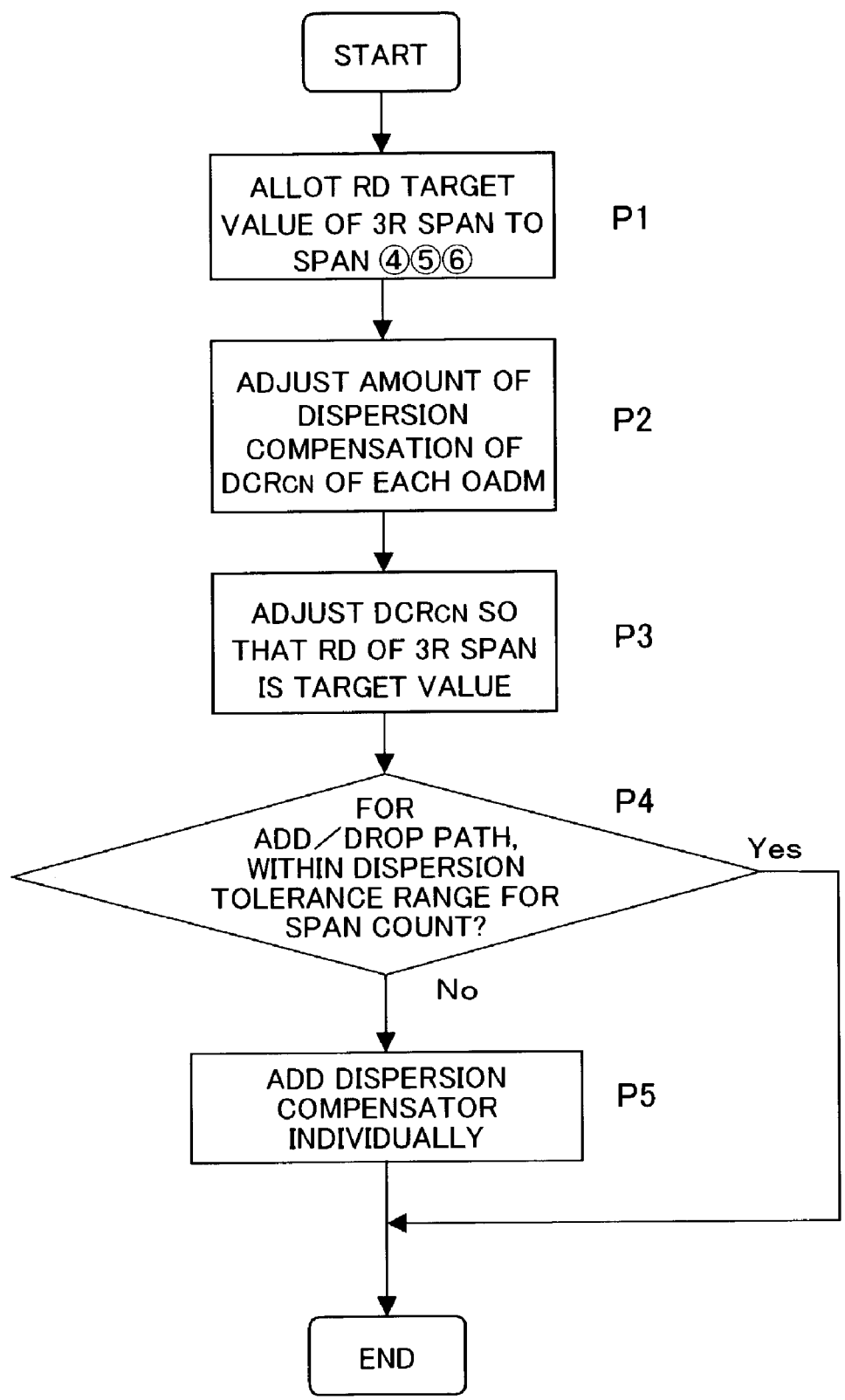
FIG. 11 shows a process flow of FIGS. 10A and 10B.

In FIG. 11, which is a flow chart showing the processes of a second embodiment, up to process steps P1-P3 are similar to the flow in FIG. 6.

Continuing from the process steps P3, for the path groups ④ and ⑤ which are added and dropped, it is judged whether the residual dispersion value falls within the dispersion tolerance range for the span count ② concerned (process step P4). Where any individual channel ch does not fall within the dispersion tolerance range (process step P4, No), dispersion compensators 21 and 31 are individually added (process step P5).

Then, in the added individual dispersion compensators 21 and 31, the amount of dispersion compensation of the added individual dispersion compensators 21 and 31 is set by way of the following formula for associated channels ch so that the residual dispersion value falls within the tolerance range.

dispersion tolerance minimum value (Min)<(residual dispersion value of individual compensator)+ (residual dispersion value of add/drop node) <dispersion tolerance maximum (Max)

Figure 12:
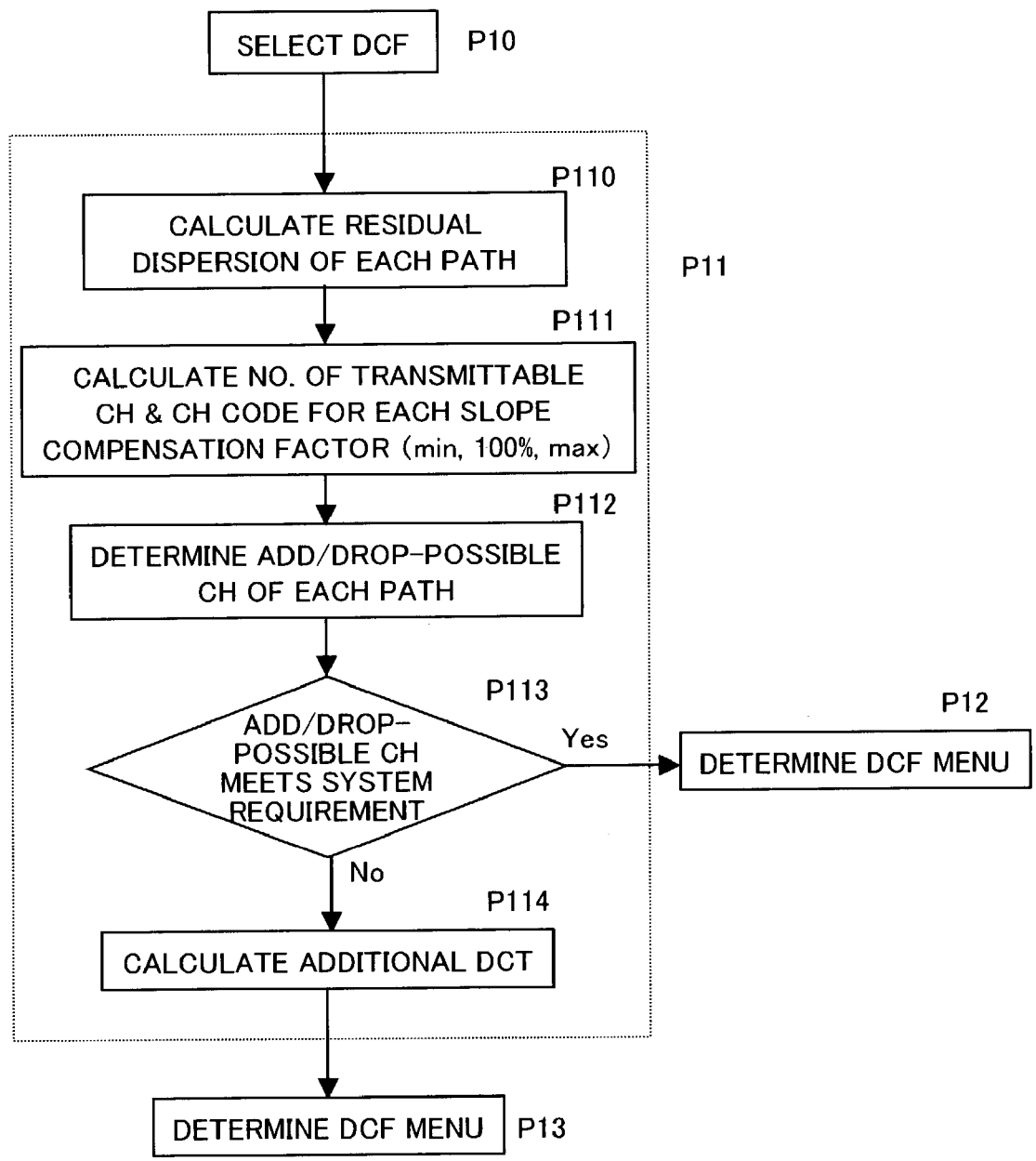
FIG. 12 shows a process flow for determining addition of an individual dispersion compensator for the embodiment of FIGS. 10A and 10B.

Referring to the flow of FIG. 12, a further description will be made of a process that determines addition of an individual dispersion compensator in the embodiment of FIGS. 10A and 10B.

By selecting a dispersion compensator to set the amount of dispersion compensation (process step P10), the number of add/drop-possible channels ch at a node with the dispersion compensator concerned is figured out (process step P11).

Through the calculation process of the number of add/drop-possible channels ch, the residual dispersion of each path is figured out (process step P110). With the calculated residual dispersion, the slope compensation factor is changed to min and max, and the number of transmittable channels and channel codes are calculated for each slope compensation factor (process step P111). This calculation of the number of transmittable channels and channel codes for each slope compensation factor is feasible based on the principle illustrated in FIG. 8.

As a result of this, add/drop-possible channels of each path are determined (process step P112). Determined add/drop-possible channels for each path are added, and it is judged whether add/drop-possible channels meet system requirements (process step P113).

If affirmative, where the system requirements are being met (Step S113, Yes), there is no additional dispersion compensator, and if negative, where the system requirements are not being met (Step S113, No), an additional dispersion compensator is provided (process steps P12 and P13).

In contrast with the embodiment where the dispersion compensators are additionally provided for individual channels ch which fall out of the tolerance range, a third embodiment of the present invention will then be described by way of example where the transmission chirp setting is controlled.

Figure 13:
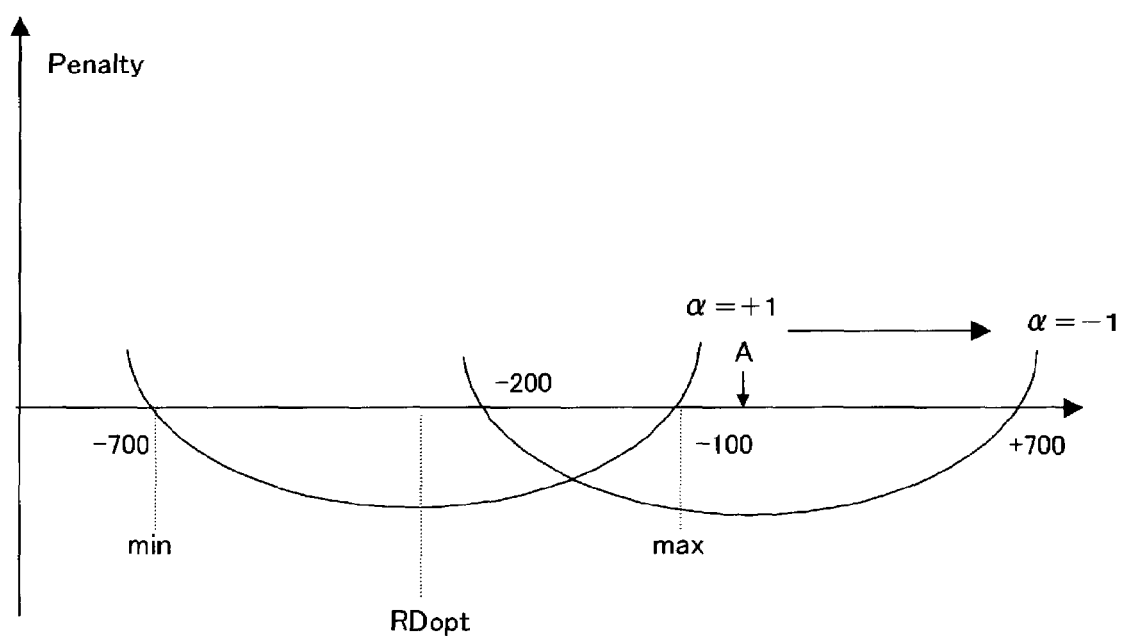
FIG. 13 shows a fluctuation of the maximum value and minimum value of a dispersion value due to chirp.

FIG. 13 is a qualitative example, showing variances of the maximum and minimum of the transmittable residual dispersion value, arising from chirp. In FIG. 13, it is shown that if the alpha parameter, being a chirp value, changes, there occur fluctuations of the minimum (min) and maximum (max) of the tolerance width around the optimal value RDopt of the residual dispersion.

Now, assume that by way of example, if the dispersion value of an individual channel ch A exceeds the maximum dispersion value of +100 when the maximum dispersion value is +100 and minimum dispersion value is −700 and when the alpha parameter=+1, then it does not fall within the dispersion tolerance range.

On the contrary, if the alpha parameter is changed to equal −1, then the maximum dispersion value moves to +700 and the minimum dispersion value to −100. Accordingly, the residual dispersion value of the individual channel A falls within the tolerance range where the alpha parameter=−1.

Figure 14:
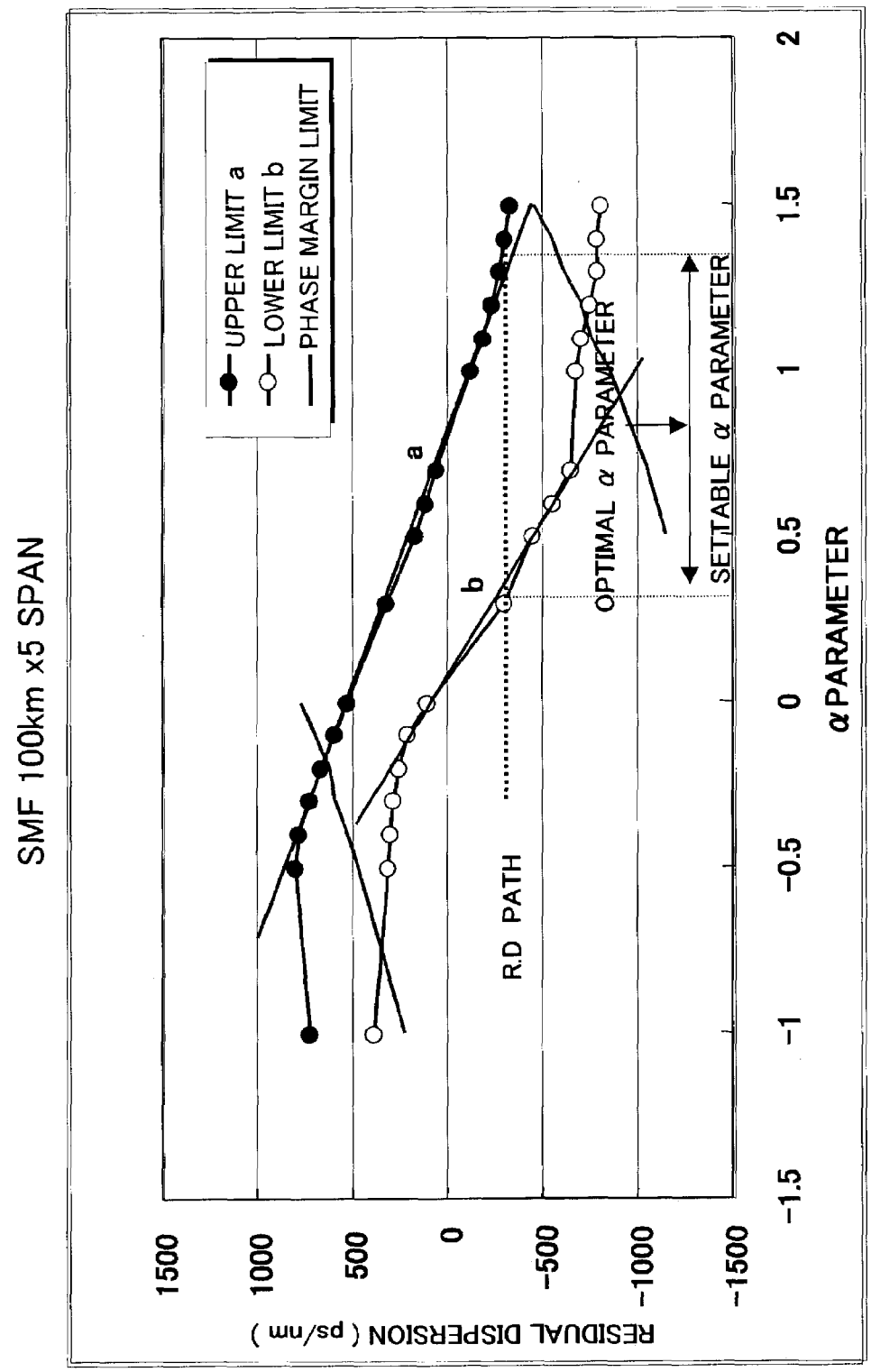
FIG. 14 shows a relationship between a residual dispersion and an alpha parameter, given SMF 100 km×5span, with residual dispersion on the vertical axis and the alpha parameter on the horizontal axis.

FIG. 14 shows the relationship between the residual dispersion and the alpha parameter, given SMF 100 km×5 spans, with the residual dispersion on the vertical axis and the alpha parameter on the horizontal axis. In FIG. 14, an upper limit, a, and a lower limit, b, of the residual dispersion are plotted for when the alpha parameter is changed based on the relationship of FIG. 13. By this, it can be understood that the range joining the upper limit, a, and the lower limit, b, of the residual dispersion value for a given path is the settable alpha parameter range.

Figure 15:
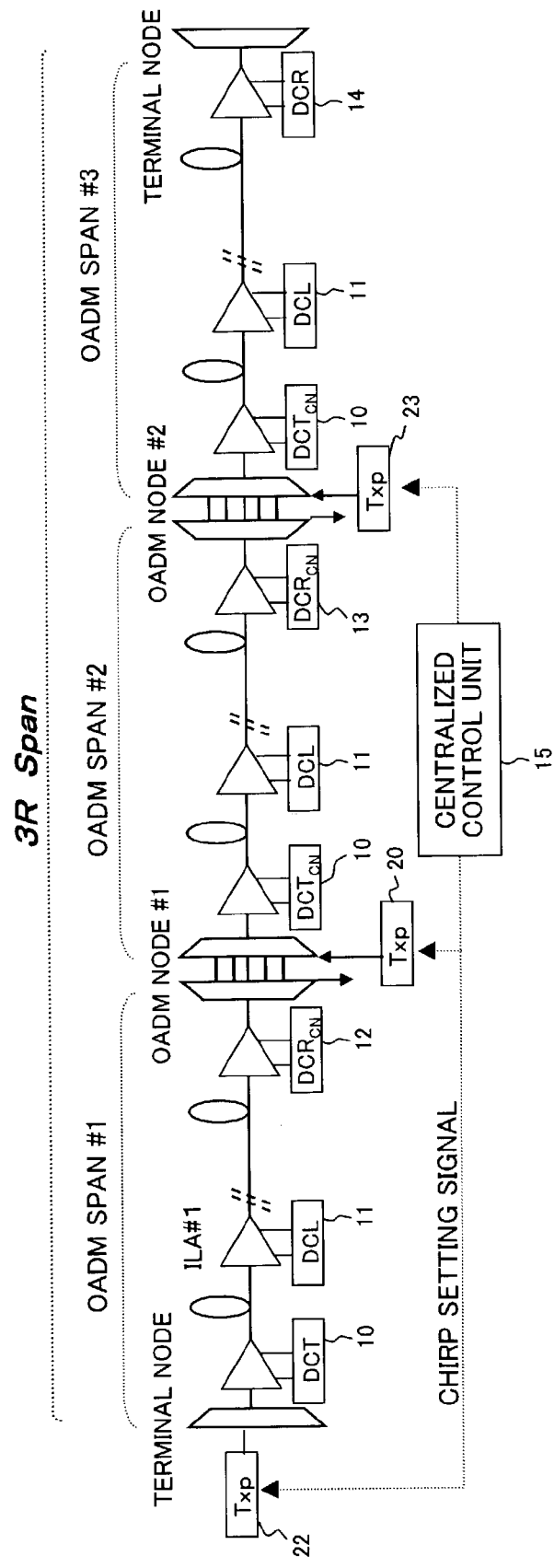
FIG. 15 shows an embodiment where the optimal alpha parameter is set at a transmitter, with FIG. 12 being an action flow thereof.
Figure 16:
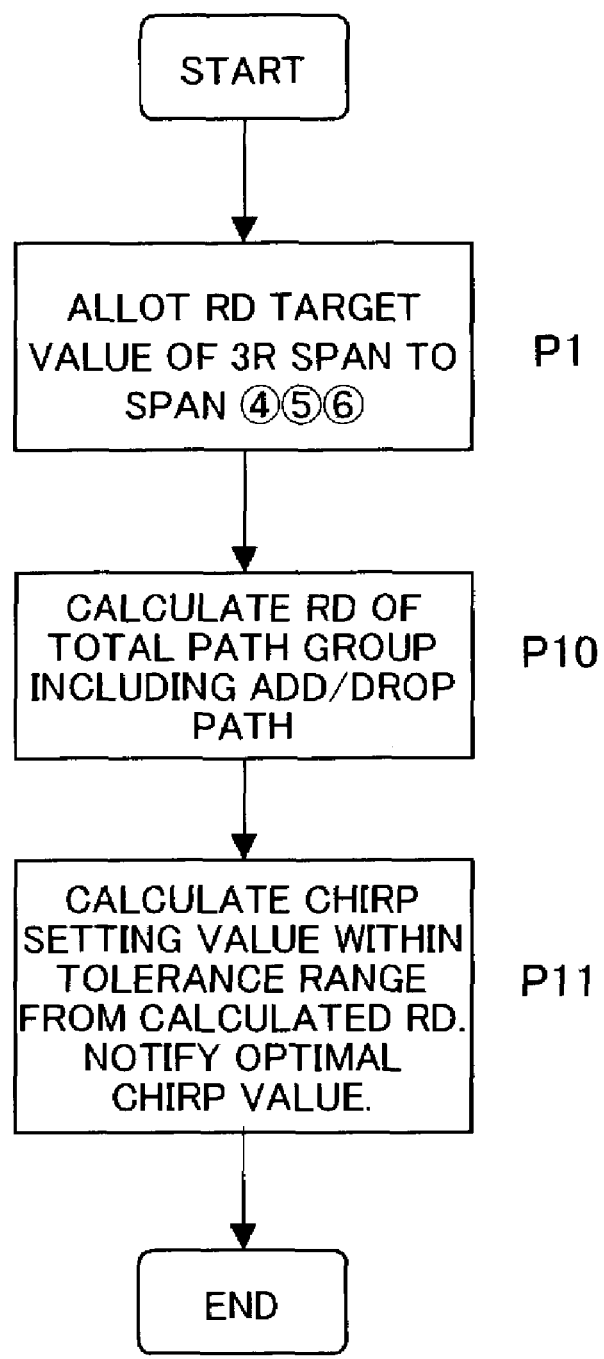
FIG. 16 shows the embodiment where the optimal alpha parameter is set at the transmitter, with FIG. 12 being an action flow thereof.

Accordingly, the median of this settable alpha parameter range is set in a transmitter as the optimal alpha parameter. FIG. 15 shows an embodiment where such an optimal alpha parameter is set in the transmitter, and FIG. 16 shows an action flow thereof.

A centralized control unit 15 is provided in addition to the configuration of FIG. 1. At this central control unit 15, similar to the example of FIG. 6, the amount of dispersion compensation for the dispersion compensators 12 and 13 of the OADM spans #1 and #2 is sought after similarly through the processing of the process step P1 of FIG. 6 (process step P1).

Next, the centralized control unit 15 figures out the amount of dispersion compensation of the dispersion compensators 12 and 13 at the terminal nodes #A and #B, intermediary amplifier stages ILA #1, #2, and #3, as well as the OADM nodes #1 and #2, and the residual dispersion value of total path groups including the add/drop paths ④, ⑤, and ⑥ based on the amount of dispersion compensation of the transmission line between the terminal nodes #A and #B (process step P10).

Further, similarly to the process step P4 of FIG. 11 the residual dispersion value is calculated for each individual channel ch.

Based on the relational diagram of FIG. 14 from the calculated residual dispersion value, an optimal chirp setting value alpha parameter falling within the tolerance range is figured out. This calculated alpha parameter is fed as a chirp setting signal to each of the transmitters 20, 22, and 23 (process step P11). Each of the transmitters 20, 22, and 23 provide a control of an external modulator, etc., not shown, based on the chirp setting signal received.

Figure 17:
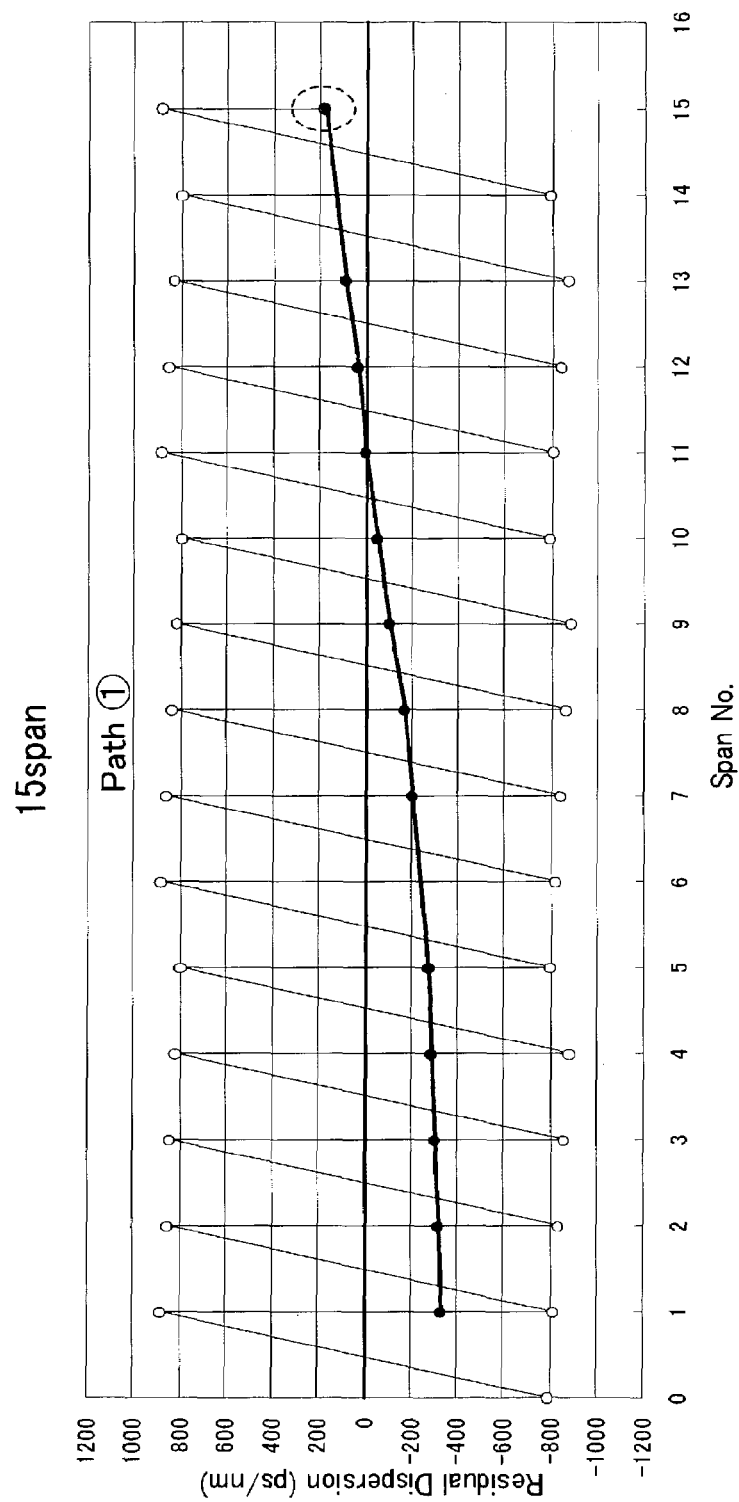
FIG. 17 shows a comparison of a target value and a residual dispersion value for each span of path group ① passing through 15 spans in the conventional system.
Figure 18:
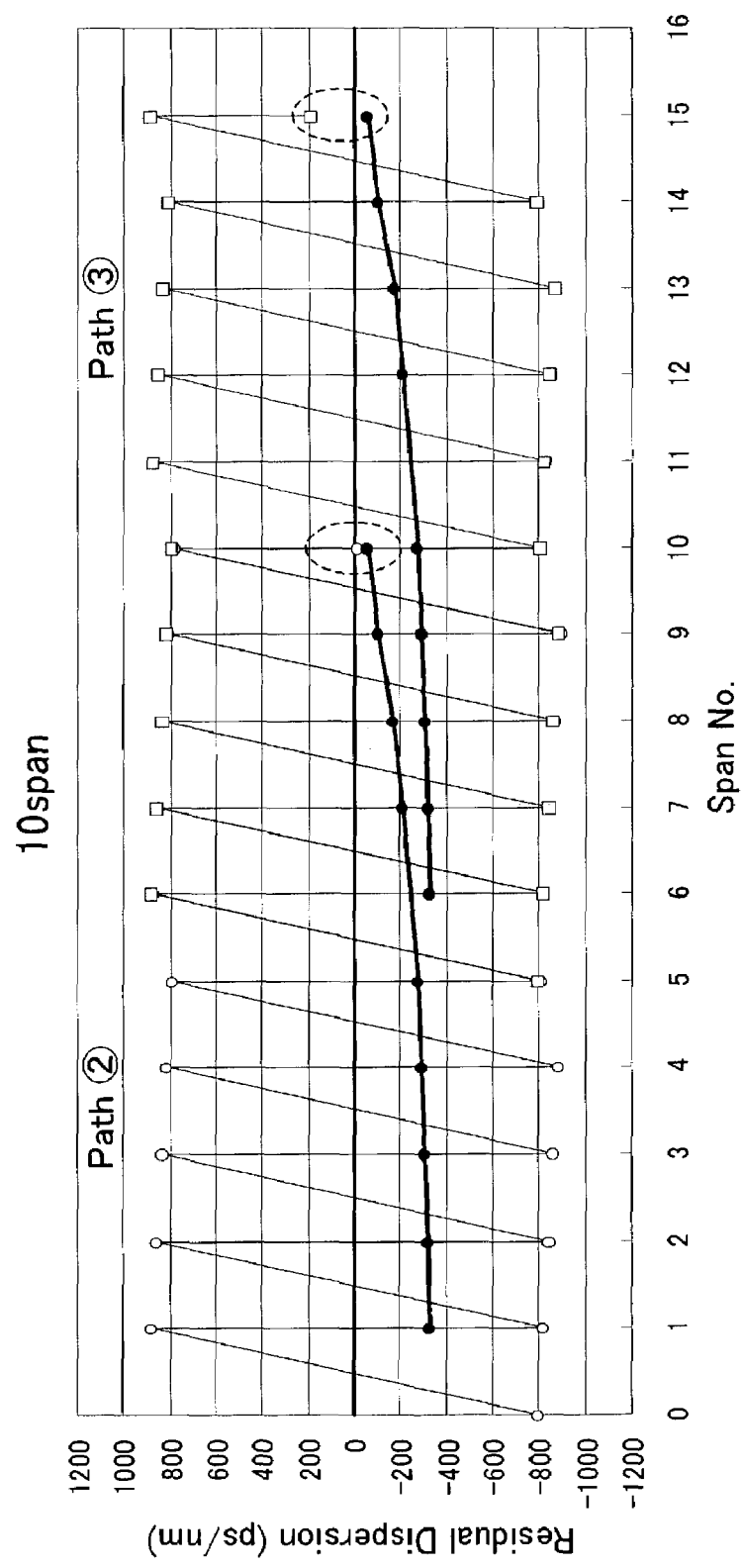
FIG. 18 shows a comparison of a target value and a residual dispersion value for each span of path groups ② and ④ passing through 10 spans in the conventional system.
Figure 19:
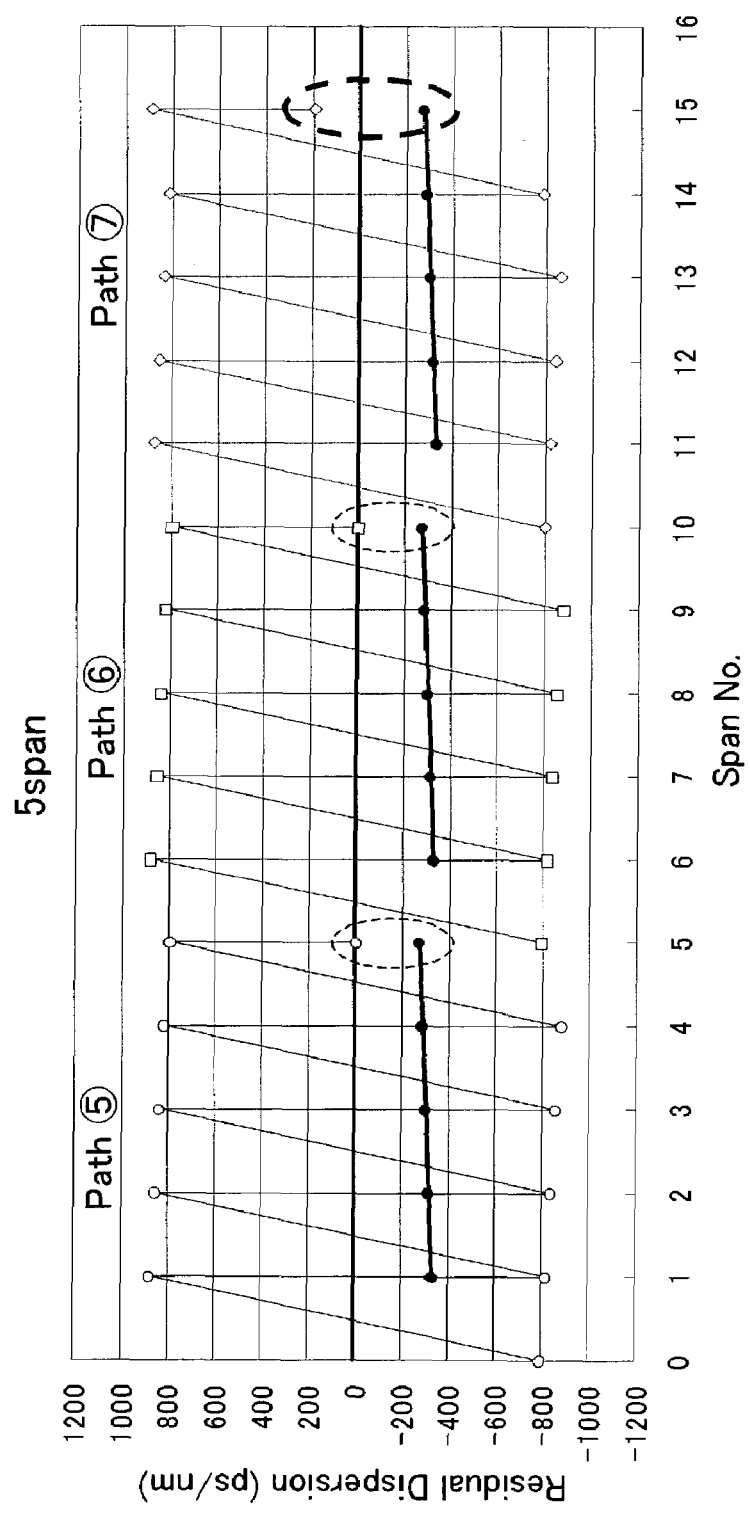
FIG. 19 shows a comparison of a target value and a residual dispersion value for each span of path groups ③, ⑤, and ⑥ passing through 5 spans in the conventional system.

FIGS. 17-19 show an example of measurement, based on a method to make null the residual dispersion value RD occurring at 1 span by means of the transmitting-end dispersion compensator (DCT) 10 which compensates the wavelength dispersion at the former portion for each 1 span supposed by the present inventors, and the line dispersion compensator (DCL) 11 which compensates the wavelength dispersion at the latter portion for each 1 span.

In FIGS. 17-19, comparison is made between a target value and the residual dispersion value per span of the path group ① which passes through 15 spans. It can be understood that at the $15^{th}$ span, the residual dispersion value of the path group ① coincides with the target value.

On the contrary, in FIG. 18, comparison is made between the target value and the residual dispersion value per span of the path groups ② and ④ which pass through 10 spans. It can be understood that the path group ④ experiences a larger deviation from the target value at the $15^{th}$ span.

Further, in FIG. 19, comparison is made between the target value and the residual dispersion value per span of the path groups ③, ⑤, and ⑥ which pass through 5 spans. It can be seen that the path group ⑥ undergoes a larger deviation from the target value at the $15^{th}$ span.

Figure 20:
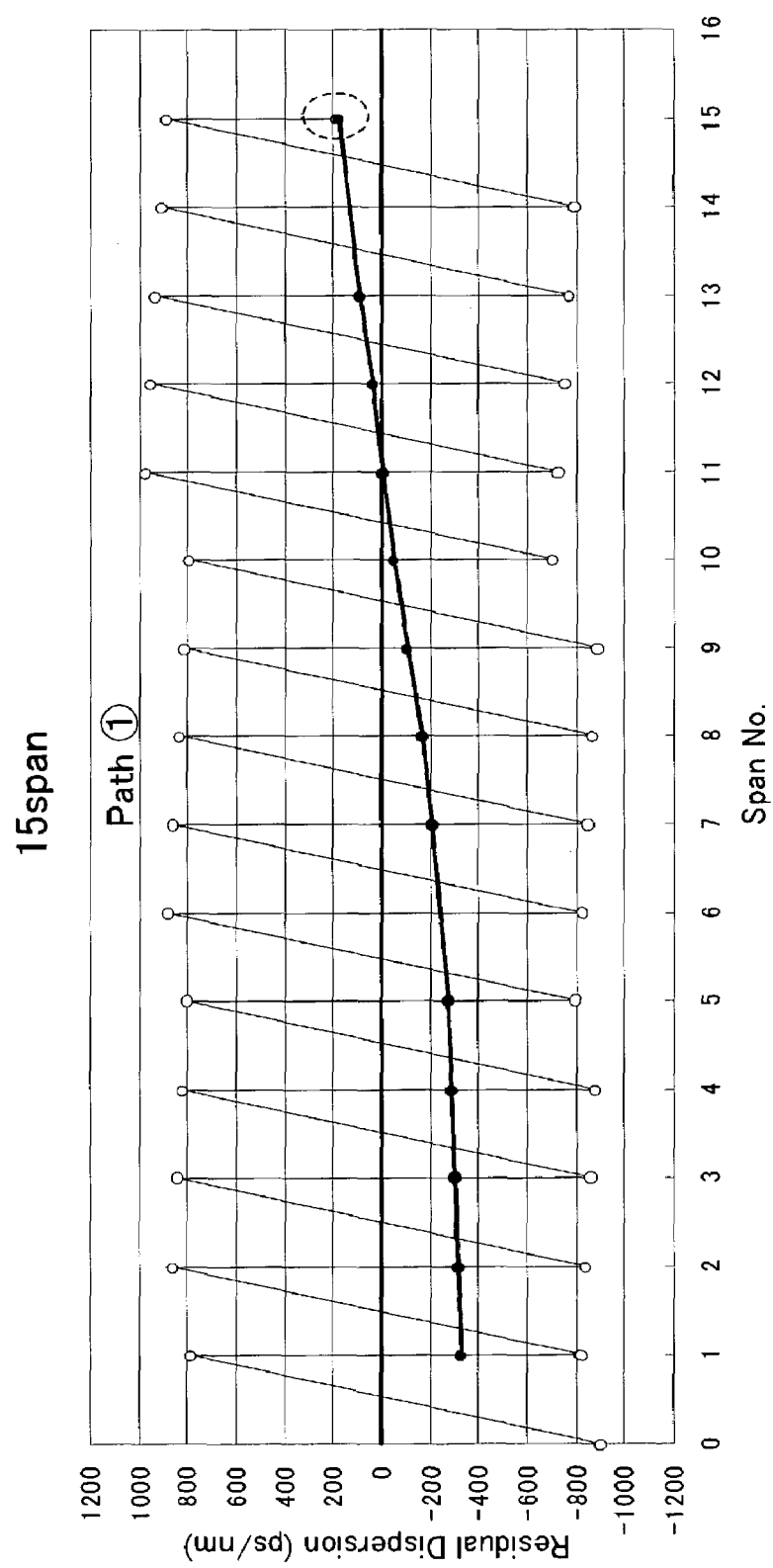
FIG. 20 shows a comparison of a target value and a residual dispersion value for each span of path group ① passing through 15 spans, in the case where the present invention is applied thereto.
Figure 21:
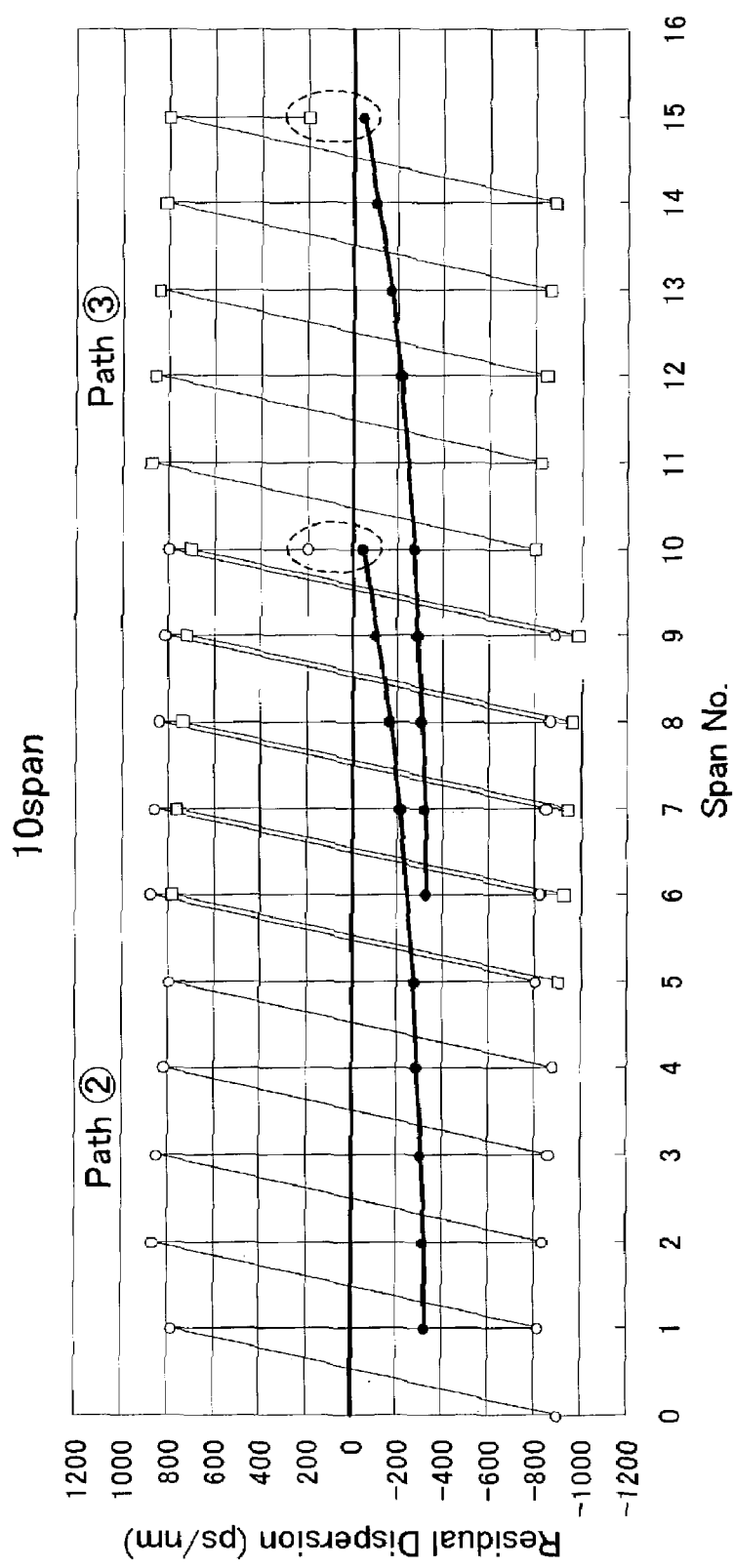
FIG. 21 shows a comparison of a target value and a residual dispersion value for each span of path groups ② and ④ passing through 10 spans, in the case where the present invention is applied thereto.
Figure 22:
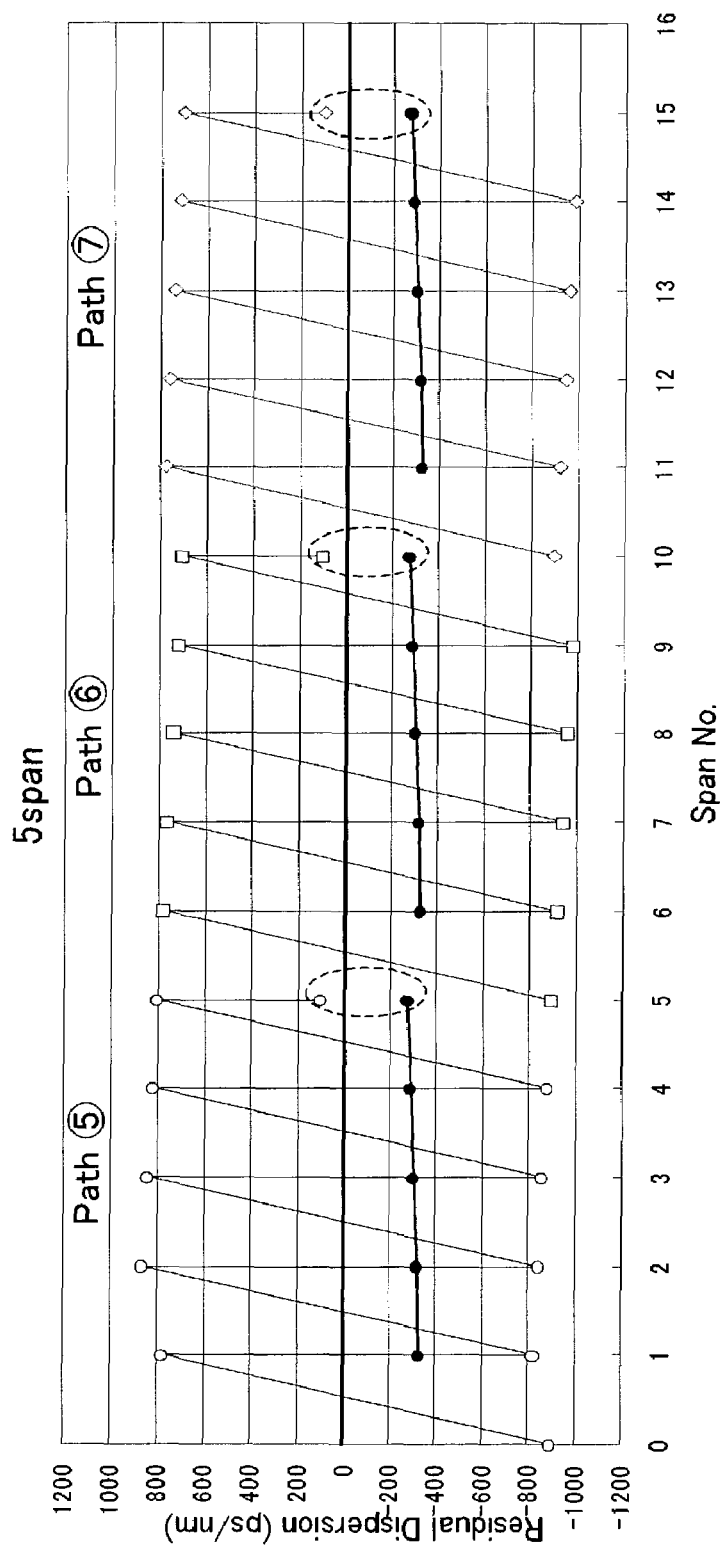
FIG. 22 is a comparison of a target value and a residual dispersion value for each span of path groups ③, ⑤, and ⑥ passing through 5 spans, in the case where the present invention is applied thereto.

FIGS. 20-22 show examples of measurement to which the present invention is applied, to be compared with FIGS. 17-19, respectively.

In FIG. 20, comparison is made between a target value and the residual dispersion value per span of the path group ① which passes through 15 spans. It can be understood that at the $15^{th}$ span, the residual dispersion value of the path group ① coincides with the target value.

On the contrary, in FIG. 21, comparison is made between the target value and the residual dispersion value per span of the path groups ② and ④ which pass through 10 spans. It can be seen that the differences from each target value at the $10^{th}$ span of the path group ② and at the $15^{th}$ span of the path group ④ are substantially the same, and that those differences are smaller than the difference from the target value of the path group ④ in FIG. 18.

Further, in FIG. 22, comparison is made between the target value and the residual dispersion value per span of path groups ③, ⑤, and ⑥ which pass through 5 spans. The path group ⑥ has at the $15^{th}$ span a smaller deviation from the target value, as compared with FIG. 19, and has thereat substantially the same magnitude as the other path groups ③ and ⑤.

As set forth hereinabove by way of the embodiments in conjunction with the drawings, the present invention enables the dispersion compensation values to be set so as to be transmittable to any path groups in the WDM optical communication system having the OADM nodes.

In the above embodiments, the above explanation is directed only to span count, but the present invention is not restricted to use in terms of the span count, and "total dispersion" or "total length" can be also applied for the present invention in stead of the total span count between the transmitting-end and receiving-end terminal nodes.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A wavelength division multiplexing optical communication system, comprising:

a transmitting-end terminal node and a receiving-end terminal node;

a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, wherein when taking as a reference a residual dispersion target value of between the transmitting-end terminal node and the receiving-end terminal node, a residual dispersion target value for a node segment between one of the terminal nodes and one of the add drop multiplexing (OADM) nodes and a residual dispersion target value for a node-to-node segment between two of the add drop multiplexing (OADM) nodes are set so as to be proportional to ratios of span counts in the node segment and in the node-to-node segment, respectively, to a total span count between the transmitting-end and receiving-end terminal nodes, each add drop multiplexing (OADM) node has dispersion compensators disposed at its transmitting-end and receiving end, respectively, and the amount of compensation of the transmitting-end dispersion compensator is determined from an average span distance of spans following an associated add drop multiplexing (OADM) node or from an average transmission line dispersion value.

2. A wavelength division multiplexing optical communication system, comprising:

a transmitting-end terminal node and a receiving-end terminal node;

a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, wherein when taking as a reference a residual dispersion target value of between the transmitting-end terminal node and the receiving-end terminal node, a residual dispersion target value for a node segment between one of the terminal nodes and one of the add drop multiplexing (OADM) nodes and a residual dispersion target value for a node-to-node segment between two of the add drop multiplexing (OADM) nodes are set so as to be proportional to ratios of span counts in the node segment and in the node-to-node segment, respectively, to a total span count between the transmitting-end and receiving-end terminal nodes, each add drop multiplexing (OADM) node has dispersion compensators disposed at its transmitting-end and receiving end, respectively, and the amount of compensation of the transmitting-end dispersion compensator is determined from a span distance of a span immediately posterior to an associated add drop multiplexing (OADM) node or from a transmission line dispersion value.

3. A wavelength division multiplexing optical communication system, comprising:

transmitting-end terminal node and a receiving-end terminal node;

a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, wherein when taking as a reference a residual dispersion target value of between the transmitting-end terminal node and the receiving-end terminal node, a residual dispersion target value for a node segment between one of the terminal nodes and one of the add drop multiplexing (OADM) nodes and a residual dispersion target value for a node-to-node segment between two of the add drop multiplexing (OADM) nodes are set so as to be proportional to ratios of span counts in the node segment and in the node-to-node segment, respectively, to a total span count between the transmitting-end and receiving-end terminal nodes, each add drop multiplexing (OADM) node has dispersion compensators disposed at its transmitting-end and receiving end, respectively, and the amount of dispersion compensation of the dispersion compensator at the receiving end of the add drop multiplexing (OADM) node is determined so as to coincide with a residual dispersion target value for the span count from the transmitting-end terminal node to the add drop multiplexing (OADM) node.

4. A method of setting the amount of dispersion compensation in a wavelength division multiplexing optical communication system, which includes a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, comprising:

taking as a reference a residual dispersion target value of between the transmitting-end terminal node and the receiving-end terminal node;

figuring out ratios of span counts in a node segment between one of the terminal nodes and one of the add drop multiplexing (OADM) nodes and in a node-to-node segment between two of the add drop multiplexing (OADM) nodes, to a total span count between the transmitting-end and receiving-end terminal nodes;

setting residual dispersion target values for the node segment between one of the terminal nodes and one of the add drop multiplexing (OADM) nodes and a residual dispersion target value for the node-to-node segment between two of the add drop multiplexing (OADM) nodes, so as to be proportional to the ratios, using the residual dispersion target value obtained as the reference in the taking; and controlling the setting of chirp of a transmitter, for a channel added or dropped at the add drop multiplexing (OADM) node, when the added or dropped channel falls outside of a tolerance range having an allowable maximum dispersion value and an allowable minimum dispersion value for the residual dispersion target value.

5. A method of setting the amount of dispersion compensation in a wavelength division multiplexing optical communication system, which includes a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, comprising:

taking as a reference a residual dispersion target value of between the transmitting-end terminal node and the receiving-end terminal node;

figuring out ratios of span counts in a node segment between one of the terminal nodes and one of the add drop multiplexing (OADM) nodes and in a node-to-node segment between two of the add drop multiplexing (OADM) nodes, to a total span count between the transmitting-end and receiving-end terminal nodes;

setting residual dispersion target values for the node segment between one of the terminal nodes and one of the add drop multiplexing (OADM) nodes and a residual dispersion target value for the node-to-node segment between two of the add drop multiplexing (OADM) nodes, so as to be proportional to the ratios, using the residual dispersion target value obtained as the reference in the taking; and at the transmitting end of the add drop multiplexing (OADM) node, setting the amount of compensation which is determined from an average span distance of spans following an associated add drop multiplexing (OADM) node or from an average transmission line dispersion.

6. A method of setting the amount of dispersion compensation in a wavelength division multiplexing optical communication system, which includes a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, comprising:

taking as a reference a residual dispersion target value of between the transmitting-end terminal node and the receiving-end terminal node;

figuring out ratios of span counts in a node segment between one of the terminal nodes and one of the add drop multiplexing (OADM) nodes and in a node-to-node segment between two of the add drop multiplexing (OADM) nodes, to a total span count between the transmitting-end and receiving-end terminal nodes;

setting residual dispersion target values for the node segment between one of the terminal nodes and one of the add drop multiplexing (OADM) nodes and a residual dispersion target value for the node-to-node segment between two of the add drop multiplexing (OADM) nodes, so as to be proportional to the ratios, using the residual dispersion target value obtained as the reference in the taking; and at the transmitting end of the add drop multiplexing (OADM) node, setting the amount of compensation which is determined from a span distance of a span immediately posterior to an associated add drop multiplexing (OADM) node or from a transmission line dispersion.

7. A method of setting the amount of dispersion compensation in a wavelength division multiplexing optical communication system, which includes a transmitting-end terminal node and a receiving-end terminal node; a wavelength division multiplexing optical communication transmission line including a plurality of spans each having an optical fiber, the plurality of spans joining the transmitting-end terminal node and the receiving-end terminal node; and a plurality of add drop multiplexing (OADM) nodes disposed on the wavelength division multiplexing optical communication transmission line, comprising:

taking as a reference a residual dispersion target value of between the transmitting-end terminal node and the receiving-end terminal node;

figuring out ratios of span counts in a node segment between one of the terminal nodes and one of the add drop multiplexing (OADM) nodes and in a node-to-node segment between two of the add drop multiplexing (OADM) nodes, to a total span count between the transmitting-end and receiving-end terminal nodes; and setting residual dispersion target values for the node segment between one of the terminal nodes and one of the add drop multiplexing (OADM) nodes and a residual dispersion target value for the node-to-node segment between two of the add drop multiplexing (OADM) nodes, so as to be proportional to the ratios, using the residual dispersion target value obtained as the reference in the taking, wherein the amount of dispersion compensation of a dispersion compensator at the receiving end of the add drop multiplexing (OADM) node is determined so as to coincide with a residual dispersion target value for the span count from the transmitting-end terminal node to the add drop multiplexing (OADM) node.

* * * * *